United States Patent
Ewing

(10) Patent No.: US 7,302,945 B2
(45) Date of Patent: Dec. 4, 2007

(54) COMPOUND ARCHERY BOW WITH AN ADAPTOR DEVICE FOR CARRYING A COMPOUND ARCHERY BOW

(75) Inventor: Gregg L. Ewing, 37 Alice Cir., Greensburg, PA (US) 15601

(73) Assignee: Gregg L. Ewing, Greensburg, PA (US)

( * ) Notice: Subject to any disclaimer, the term of this patent is extended or adjusted under 35 U.S.C. 154(b) by 84 days.

(21) Appl. No.: 11/336,719

(22) Filed: Jan. 20, 2006

(65) Prior Publication Data

US 2006/0174861 A1 Aug. 10, 2006

(51) Int. Cl.
*F41B 5/14* (2006.01)

(52) U.S. Cl. .................... 124/86; 24/455; 224/257; 224/916; 403/263

(58) Field of Classification Search .............. 24/326, 24/455, 459, 489, 494; 124/23.1, 25.6, 86; 224/257, 600, 607, 916; 403/230, 240, 243, 403/263

See application file for complete search history.

(56) References Cited

U.S. PATENT DOCUMENTS

| | | | | |
|---|---|---|---|---|
| 487,127 A | * | 11/1892 | Moore | ............... 24/17 R |
| 1,232,690 A | * | 7/1917 | Keenan | ............... 248/103 |
| 2,066,732 A | * | 1/1937 | Kunz | ............... 396/652 |
| 2,543,881 A | * | 3/1951 | Umphlette et al. | ............ 43/22 |
| 2,858,093 A | * | 10/1958 | Knoll | ............... 248/49 |
| 3,449,002 A | * | 6/1969 | Bernard | ............... 403/373 |
| 4,118,838 A | * | 10/1978 | Schiefer et al. | ........... 24/115 R |
| 5,239,976 A | * | 8/1993 | Specht | ............... 124/88 |
| 5,816,461 A | * | 10/1998 | Balcom | ............... 224/269 |
| 5,890,478 A | * | 4/1999 | Dunmore | ............... 124/86 |
| 5,926,922 A | * | 7/1999 | Stottle | ............... 24/23 R |
| 5,954,247 A | * | 9/1999 | Savine et al. | ............ 224/148.4 |
| 2003/0049582 A1 | * | 3/2003 | Abels et al. | ............... 433/11 |
| 2006/0247636 A1 | * | 11/2006 | Yuan et al. | ............... 606/61 |

* cited by examiner

*Primary Examiner*—John A. Ricci
(74) *Attorney, Agent, or Firm*—Nils H. Ljungman & Associates

(57) ABSTRACT

A compound archery bow with an adaptor device for carrying the bow. The adaptor device includes a cylindrical body portion, having a rear extension piece having holes to receive a carrier ring, connected to a harness, which is held or worn by an archer. The cylindrical body portion includes a longitudinal open portion, intended to receive a cable guard rod of the compound archery bow. Locking grooves are disposed on each side of the longitudinal open portion. A C-shaped locking device is provided, having a locking lip to engage with the locking grooves; the locking device movable from an open non-locked position to a closed locked position, to retain the cylindrical body portion on the cable guard rod.

20 Claims, 24 Drawing Sheets

COMPOUND ARCHERY BOW WITH AN ADAPTOR DEVICE FOR CARRYING A COMPOUND ARCHERY BOW

BACKGROUND

1. Technical Field

The present application relates to a compound archery bow with an adaptor device for carrying a compound archery bow. More specifically, the present application relates to a carrying adaptor device for a compound bow which is removably attached to the compound bow and to a strap or harness worn by a user, in order to carry the compound bow without the use of the user's hands.

2. Background Information

The compound bow is a tool widely used by hunters and target or sport shooters of all types and of all experience levels. However, the compound bow can be cumbersome to carry, and can cause fatigue in the hands and arms of the user if carried for extended periods of time. If the user's hands or arms are fatigued, his aim and accuracy are more than likely to be negatively affected when the time comes to shoot at a target. Further, a user may need the use of both of his hands, for instance, to climb a tree, to navigate through the trees and shrubbery of the forest, or to catch himself from falling. If his hands are occupied by a compound bow and are therefore unavailable for use, the user may risk injury.

Therefore, a device for helping a user carry a compound bow without the use of the user's hands would help to make the user's hunting experience safer and more convenient. Such a device would further help the hunter maintain his accuracy and aim, since the device would prevent fatigue in the hands and arms caused by carrying such a cumbersome device for extended periods of time.

Therefore, a device for helping a user carry a compound bow without the use of the user's hands would help to make the user's hunting experience safer and more convenient. Such a device would further help the hunter maintain his accuracy and aim, since the device would prevent fatigue in the hands and arms caused by carrying the compound bow for extended periods of time.

OBJECT OR OBJECTS

The object is to provide a compound archery bow with an adaptor device for carrying a compound archery bow around the body of a user utilizing a strap or harness, without necessitating the use of the user's hands.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

FIG. 1A shows a perspective view of the bottom end of the adaptor device in a locked position;

DESCRIPTION OF EMBODIMENT OR EMBODIMENTS

Figure 1:
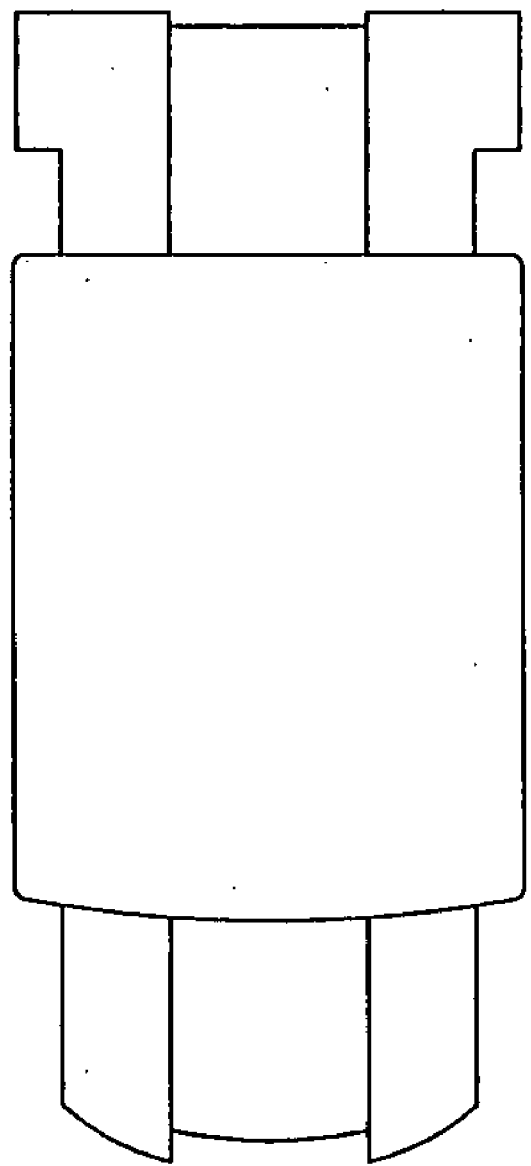
FIG. 1 shows an elevational view of an embodiment of the adaptor device for carrying a compound bow in the locked position, but not installed on the compound bow.
Figure 1A:
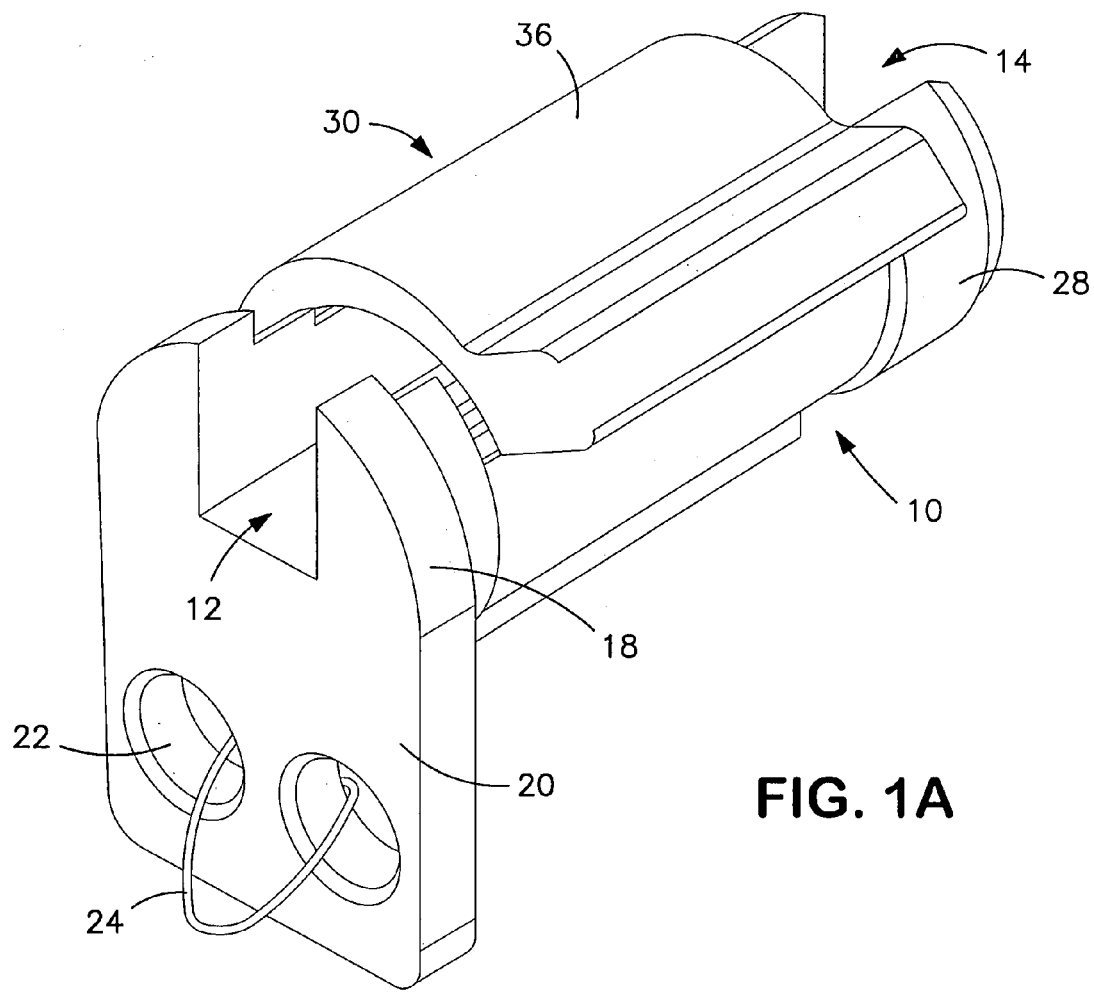
FIG. 1AA shows the adaptor device fully installed on the cable guard of a compound bow and on the strap or harness device of a user and being used by a user.
Figure 1A:
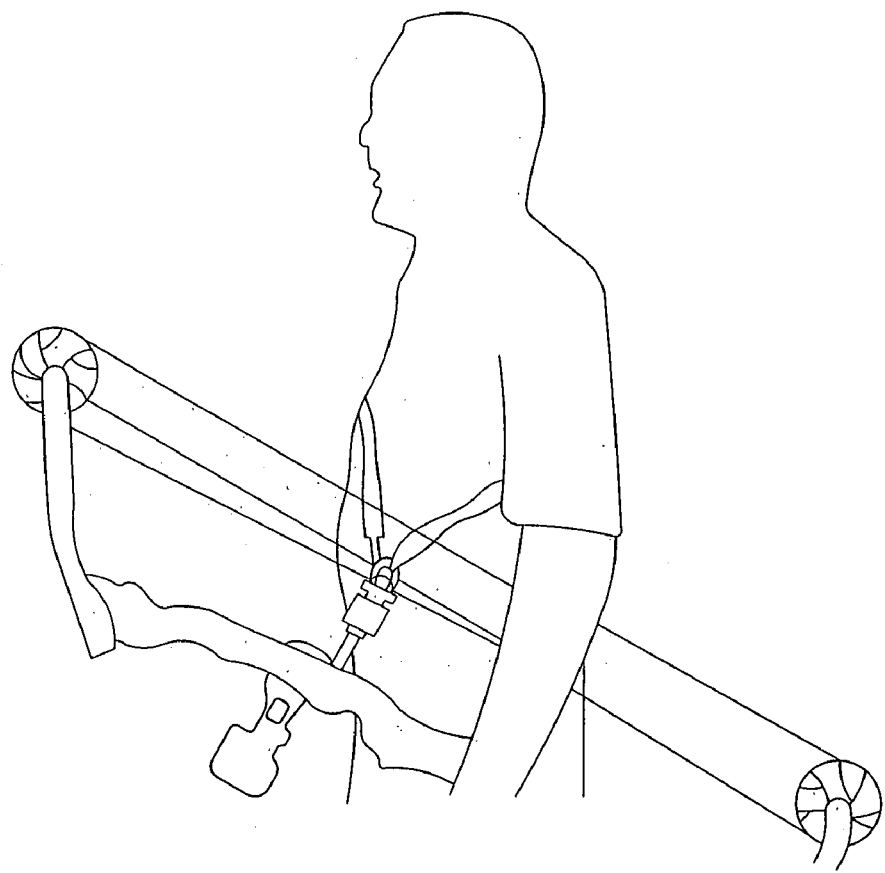

FIG. 1AA shows the adaptor device fully installed on the cable guard of a compound bow and on the strap or harness device of a user and being used by a user.

FIG. 1A shows a perspective view of an embodiment of the adaptor device for carrying a compound bow in the locked position, but not installed on the compound bow. This embodiment comprises a substantially cylindrical body portion 10, which body portion 10 has a rectangular open portion 12 extending the entire length of the body portion 10. In another possible embodiment, the open portion may be circular, or any other shape to fit onto the cable guard of a compound bow. The body portion 10 may be constructed with plastic nylon so that it does not cause marking or damage to the bow. However, the body portion 10 may also be constructed with other materials, such as other moldable plastics or metal. The open portion 12 may be open and exposed along one side of the body portion 10, such that the inside of the open portion 12 is exposed along the length of one side of the substantially cylindrical body portion 10, forming an open side 14. A set of locking grooves 16 is disposed along the length of the substantially cylindrical body portion 10. The locking grooves 16 are further disposed on each side of the open side 14 of the substantially cylindrical body portion 10, and can more clearly be seen in FIG. 1B. The locking grooves 16 are configured and disposed to receive and hold in place a locking device 30 having a locking lip 32, which can more clearly be seen in FIG. 1C.

The substantially cylindrical body portion 10 further comprises a first end portion 18 with a rear extension 20. The first end portion 18 is disposed about the top edge of the substantially cylindrical body portion 10, essentially forming a C-shape where the open side 14 breaks the first end portion 18. The rear extension 20 of the first end portion 18 extends horizontally from the body portion 10, and comprises a set of holes 22. The holes 22 are configured and disposed to hold a removable ring portion 24 for attaching a strap or harness to the substantially cylindrical body portion 10. The removable ring portion 24 may be a plastic strap, a nylon strap, a woven band, or any other type of material that could be fed through the holes 22 and securely held in place to carry the bow. In another possible embodiment, the holes 22 may be configured and disposed to receive a set of clips or clasps for attaching a strap or harness to the substantially cylindrical body portion 10. The substantially cylindrical body portion 10 further comprises a second end portion 28. The second end portion 28 is disposed about the bottom edge of the body portion 10, essentially forming a C-shape where the open side 14 breaks the second end portion 28.

Figure 1B:
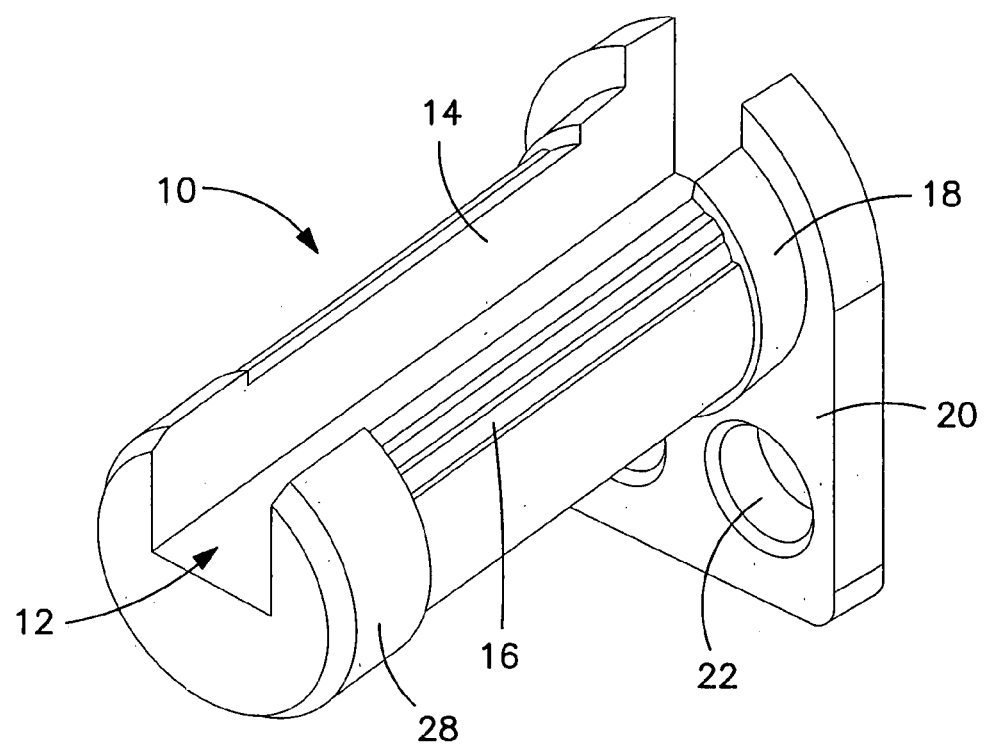
FIG. 1B shows a perspective view of the adaptor device without the locking device installed thereon.

FIG. 1B shows a perspective view of the adaptor device without the locking device 30 installed thereon. The locking grooves 16 can be seen in FIG. 1B. The locking grooves 16 are disposed horizontally along each side of the open side 14, and run substantially from the second end portion 28 to the first end portion 18. The locking grooves 16 are configured and disposed to receive and hold in place the locking lip 32 of the locking device 30, which locking device 30 can be more clearly seen in FIG. 1C.

Figure 1C:
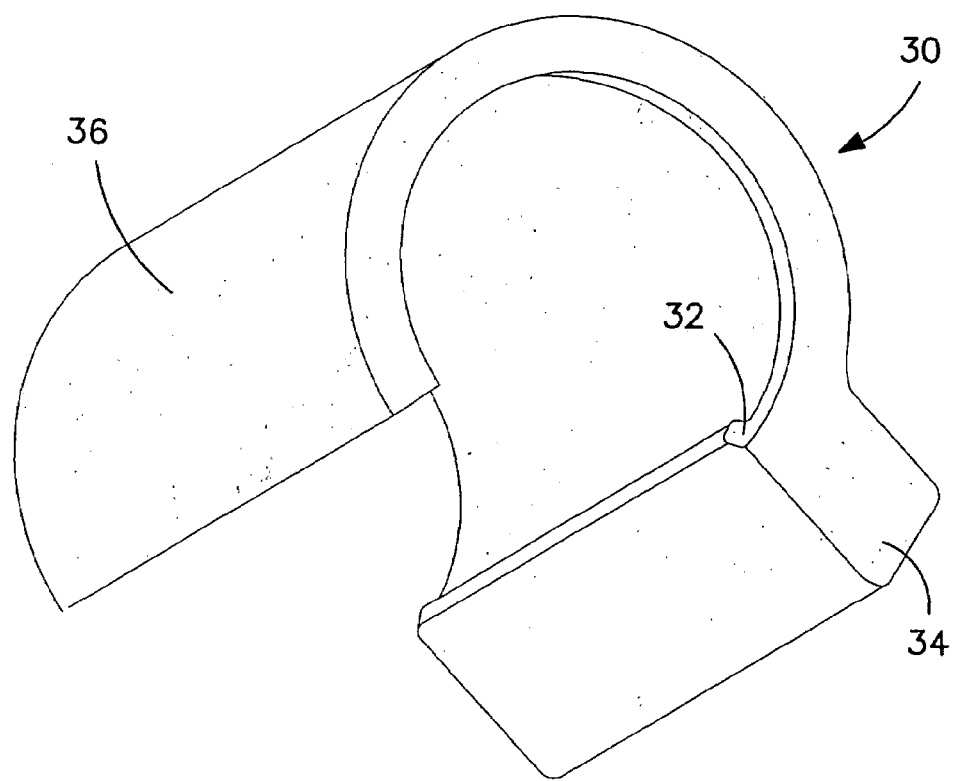
FIG. 1C shows a perspective view of the locking device.

FIG. 1C shows a perspective view of the locking device 30, not installed on the adaptor device. The locking device 30 comprises a curved piece 36, which curved piece 36 is substantially C-shaped. The locking device 30 further comprises an extended tab 34, which extended tab 34 is configured and disposed to be pushed or twisted by the fingers of a user. The inner edge of the extended tab 34 and the inner edge of the curved piece 36 converge and form a locking lip 32. The locking lip 32 is configured and disposed to rest in the locking grooves 16, such that the locking lip 32 holds the locking device 30 in place on the substantially cylindrical body portion 10. The curved piece 36 is configured and disposed to fit around or envelop the substantially cylindrical body portion 10 of the adaptor device between the second end portion 28 and the first end portion 18. The open side of the curved piece 36 is configured such that the locking device 30 can be installed on the substantially cylindrical body portion 10 simply by aligning the open side of the curved piece 36 with the length of the body portion 10 between the second end portion 28 and the first end portion 18, and firmly pressing the curved piece 36 until it locks onto the body portion 10. It should be noted that since the locking device 30 is removable, it may be installed on the body portion 10 for both right-handed and left-handed users.

Figure 2:
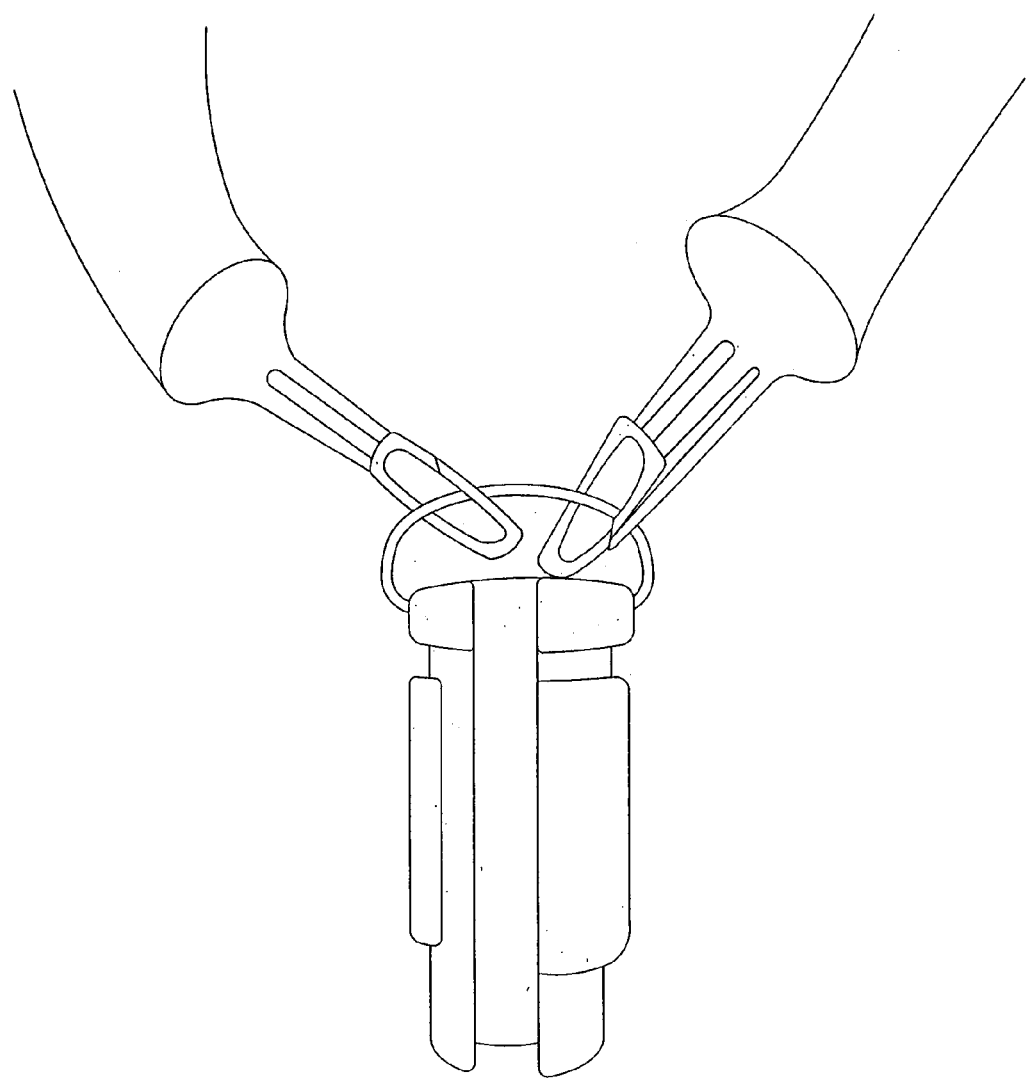
FIG. 2 shows an elevational view of an embodiment of the adaptor device in the unlocked position, and not installed on the compound bow.

FIG. 1 shows an elevational view of an embodiment of the adaptor device for carrying a compound bow in the locked position, but not installed on the compound bow. FIG. 2 shows an elevational view of an embodiment of the adaptor device in the unlocked position, but not installed on the compound bow.

Figure 3:
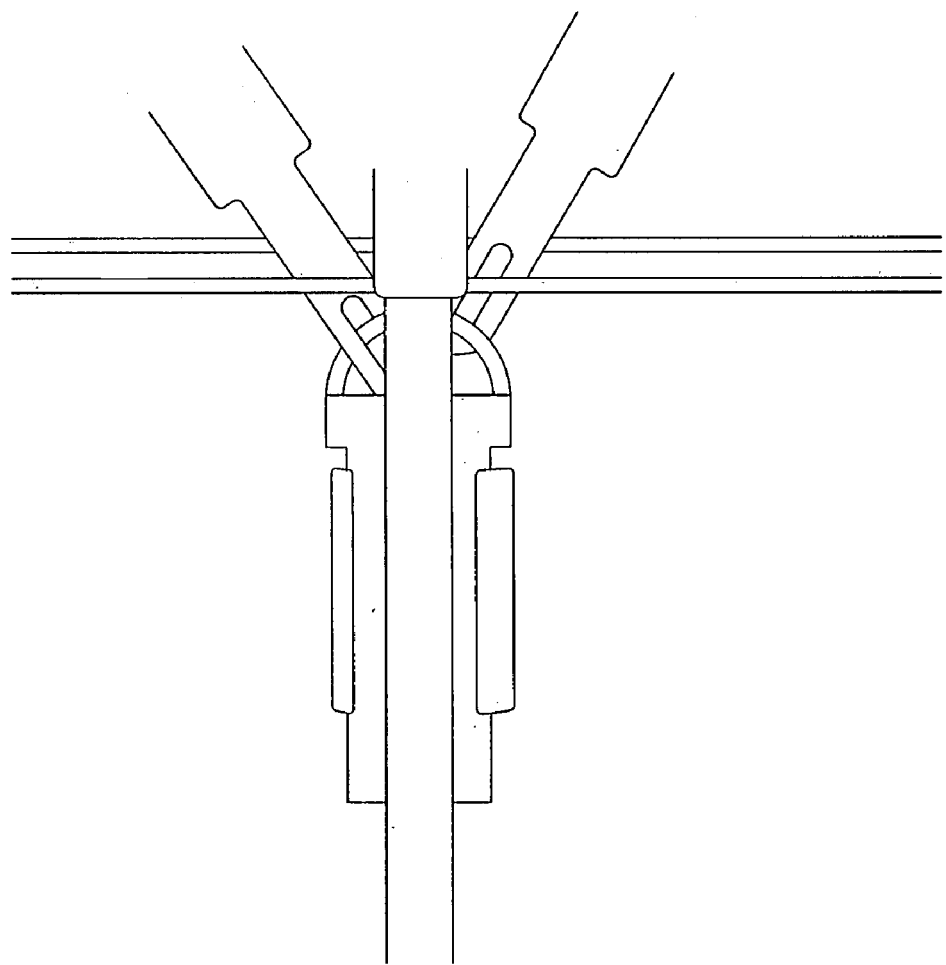
FIG. 3 shows an embodiment of the adaptor device installed on the cable guard of a compound bow, in an unlocked position.

Once the locking device 30 is installed on the substantially cylindrical body portion 10, the adaptor device can be installed on the compound bow. FIG. 3 shows an embodiment of the adaptor device installed on the cable guard of a compound bow, in an unlocked position. To install the adaptor device, the user rotates the locking device 30 such that the open side of the curved piece 36 and the open side 14 of the substantially cylindrical body portion 10 are substantially positioned one atop the other to create an open side. Next, the user pushes the adaptor device onto the cable guard of the compound bow with the rear extension 20 of the first end portion 18 positioned at the top and facing toward the body of the user. The user firmly presses the adaptor device into place, such that the cable guard rests in the open portion 12 of the substantially cylindrical body portion 10. It should be noted that the open portion could be cylindrical, which cylindrical shape could be rectangular, non-curvilinear, elliptical, circular, or non-circular.

Figure 4:
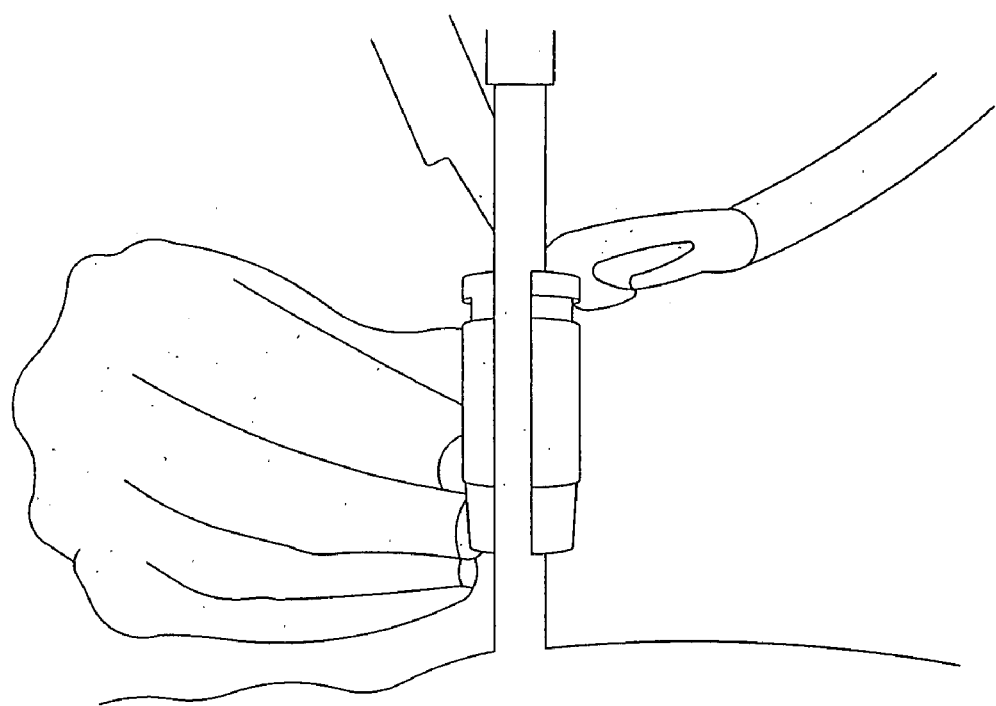
FIG. 4 shows an embodiment of the adaptor device installed on the cable guard of a compound bow, in an unlocked position.
Figure 5:
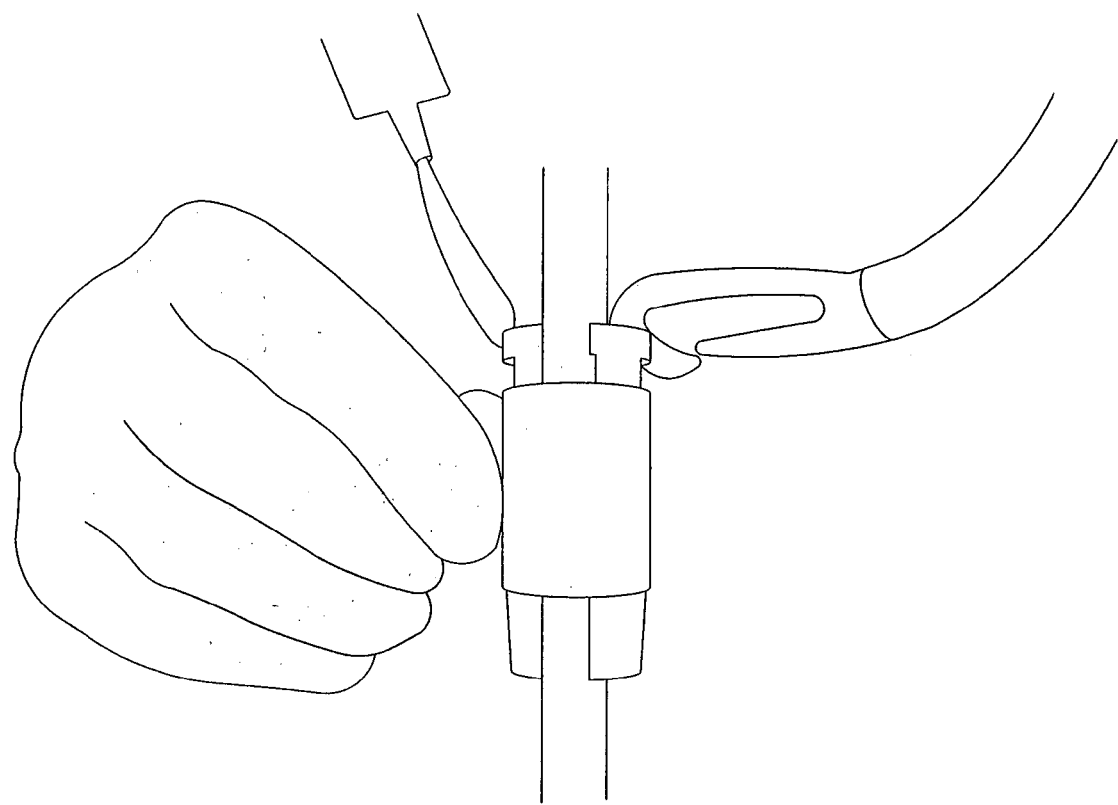
FIG. 5 shows an embodiment of the adaptor device installed on the cable guard of a compound bow, in a locked position.
Figure 6:
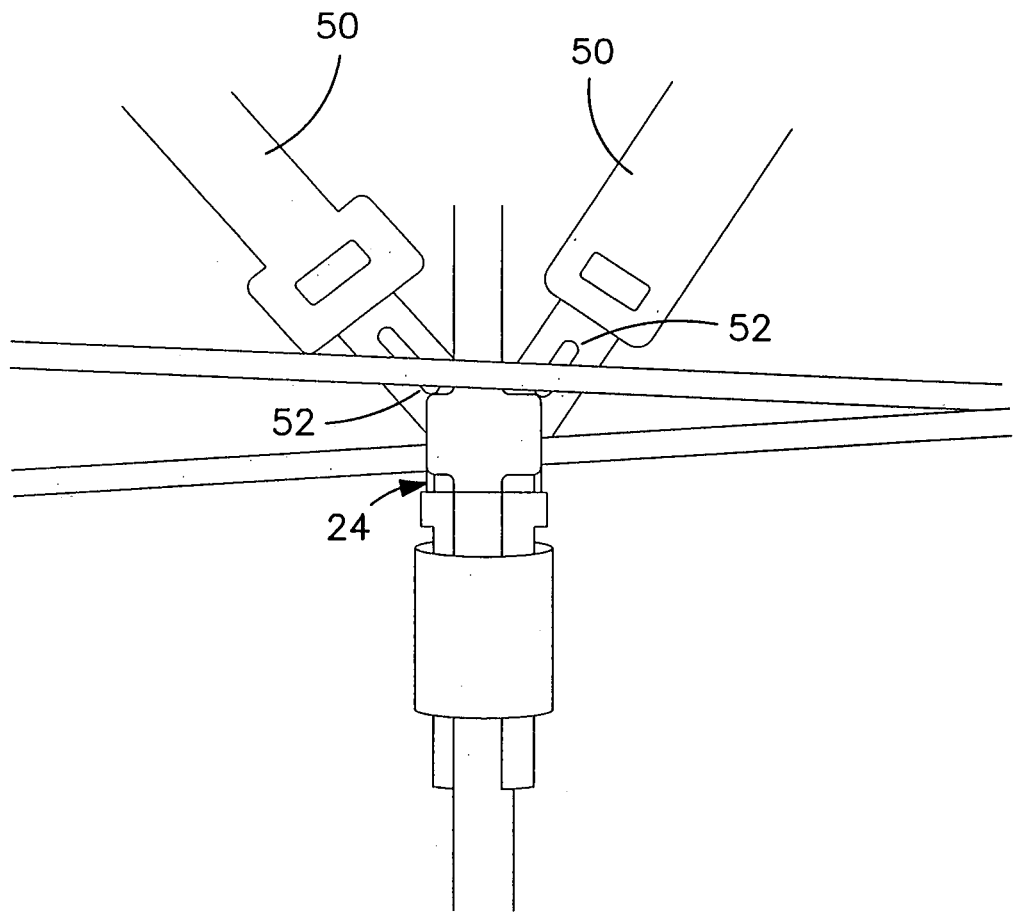
FIG. 6 shows a close-up view of an embodiment of the adaptor device installed on the cable guard of a compound bow, in a locked position.
Figure 7:
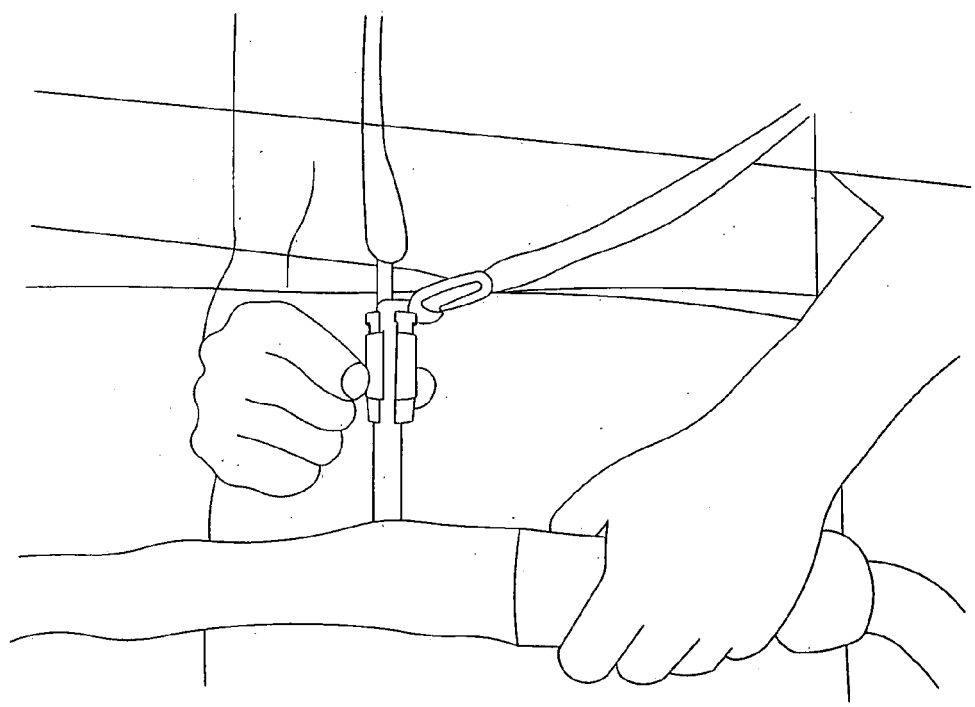
FIG. 7 shows a user installing the adaptor device on the cable guard of a compound bow.

Once the cable guard of the compound bow is resting in the open portion 12, the user pushes or twists the extended tab 34 such that the locking device 30 rotates about the substantially cylindrical body portion 10 and closes the gap of the open side 14. FIG. 4 shows a user in position to lock the adaptor device onto the cable guard of a compound bow. FIGS. 5 and 6 show a user locking the adaptor device into place on the cable guard. The user rotates the locking device 30 until the locking lip 32 is resting in the locking grooves 16. Once the locking lip 32 is resting in the locking grooves 16, the locking device 30 is secured in place, thus holding the entire adaptor device on the cable guard of the compound bow. At this point, the user may hook a strap or harness to the removable ring portion 24, thus suspending the compound bow from the strap or harness around the neck of the user. To uninstall the adaptor device, the user simply rotates the locking device 30 in the opposite direction so that the locking lip 32 becomes disengaged from the locking grooves 16 and the open side of the locking device 30 is disposed atop the open side 14 of the substantially cylindrical body portion 10. Once this open side is created, the adaptor device can be pulled away from the cable guard by the hands of the user. FIG. 6 shows the adaptor device fully installed on the cable guard of a compound bow with the strap or harness attached to the adaptor device. The harness 50 is strapped around the body of a user. The harness 50 has two clips 52, one at each end of the harness. The clips 52 are designed to be attachable and detachable, and the clips 52 are designed to clip to the carrier ring 24, which carrier ring 24 is connected to the rear extension 20 via the holes 22.

Figure 8:
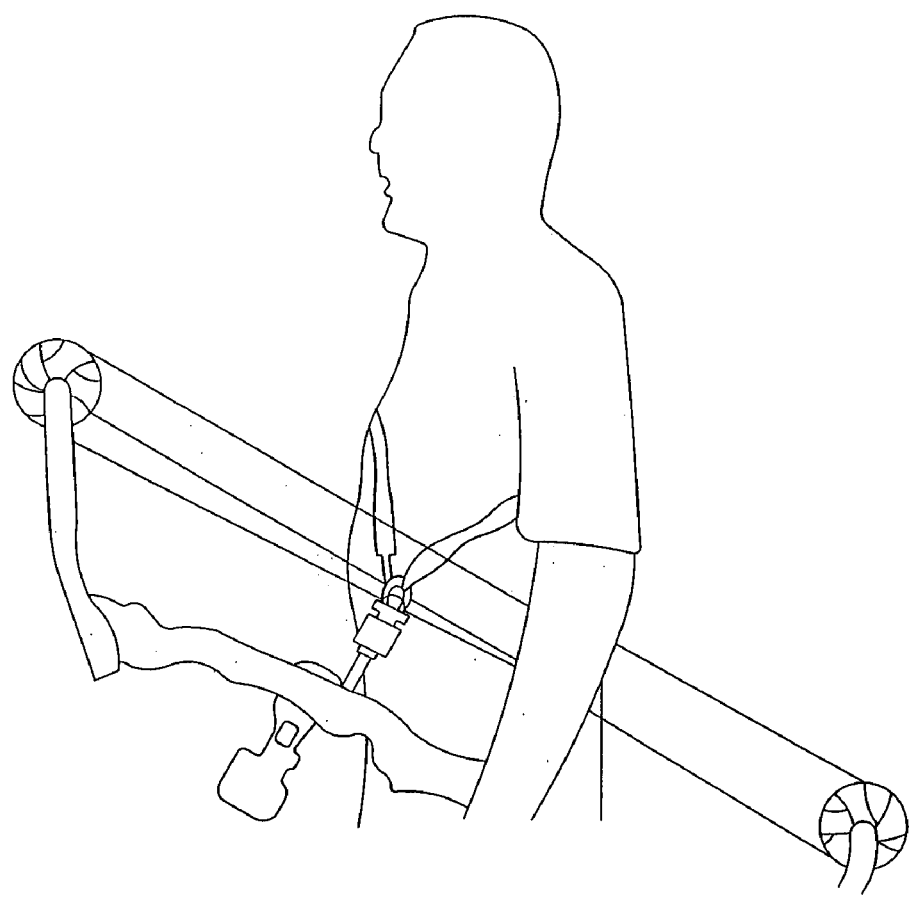
FIG. 8 shows the adaptor device fully installed on the cable guard of a compound bow and on the strap or harness device of a user.

FIG. 8 shows the adaptor device installed on the cable guard and securing a compound bow using a strap or harness around the neck of a user. The cable guard does not extend beyond the outer cable of the compound bow, and only extends approximately 1 to 2 inches beyond the inner cables. FIG. 8 clearly shows the position of the adaptor device on the cable guard of a compound bow. The adaptor device is disposed on the cable guard, substantially between the bow and the inner cables of the bow. The strap or harness is worn around the neck of the user, such that the clips or clasps attached to the adaptor device are disposed at the side of the body of the user. In this position, the compound bow is suspended by the adaptor device at the side of the body of a user.

Figure 9:
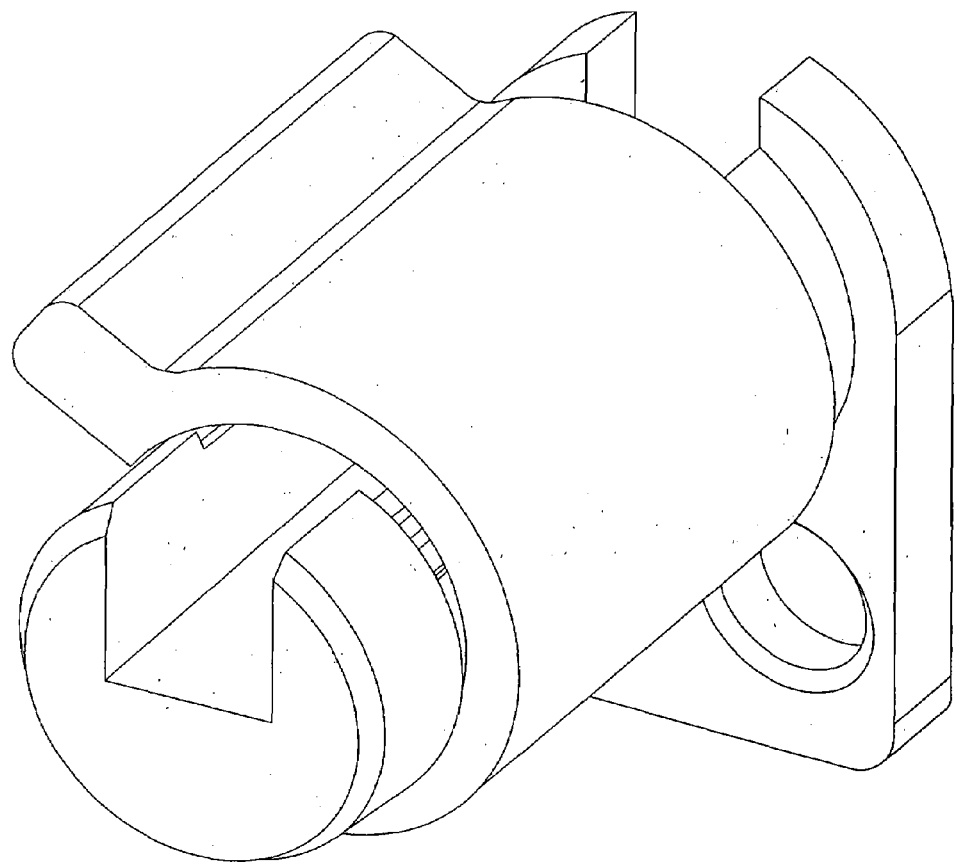
FIG. 9 shows a perspective view of the bottom end of the adaptor device in a locked position.
Figure 10:
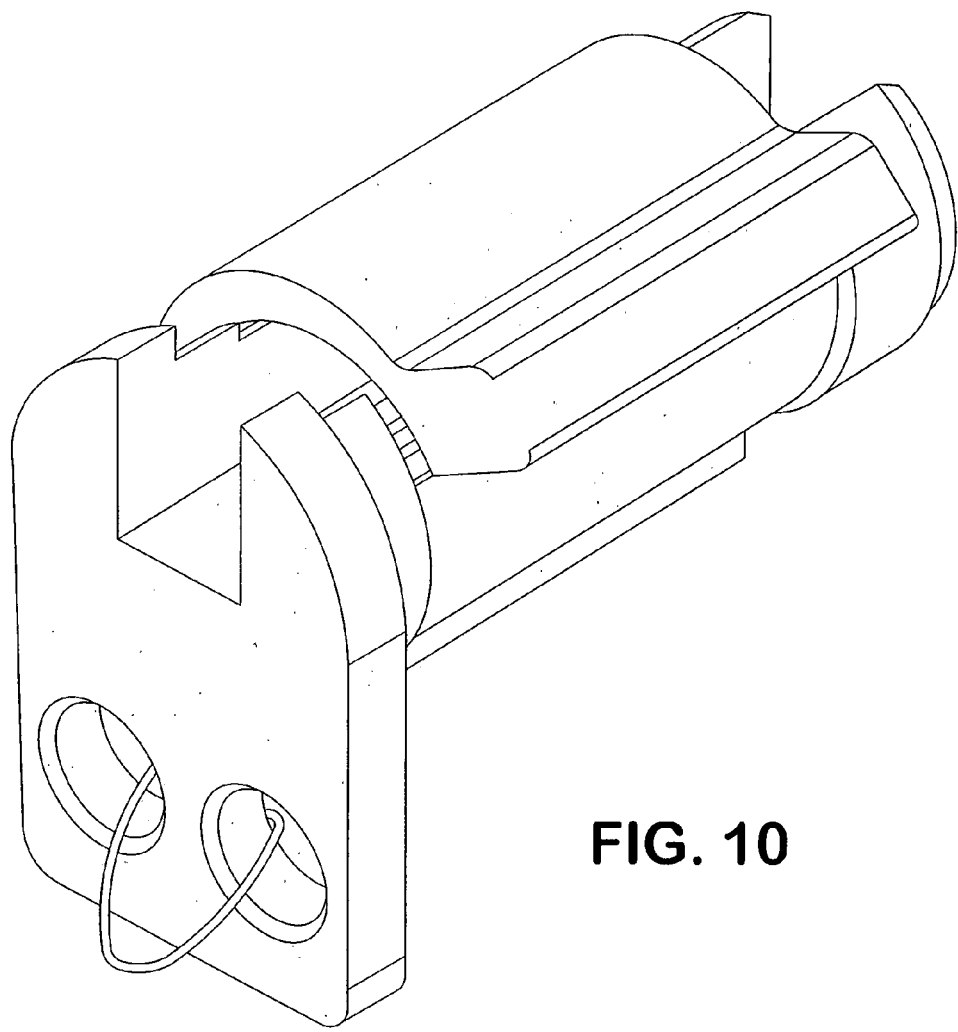
FIG. 10 shows a perspective view of the top end of the adaptor device in locked position.

FIG. 9 shows a perspective view of the adaptor device with the locking device 30 installed thereon in a locked position. The second end 28 is clearly visible in FIG. 9. FIG. 10 is similar to FIG. 1A, and shows a perspective view of the adaptor device with the locking device 30 installed thereon in a locked position. The first end 18, the rear extension 20, and the holes 22 are clearly visible in FIG. 10.

Figure 11:
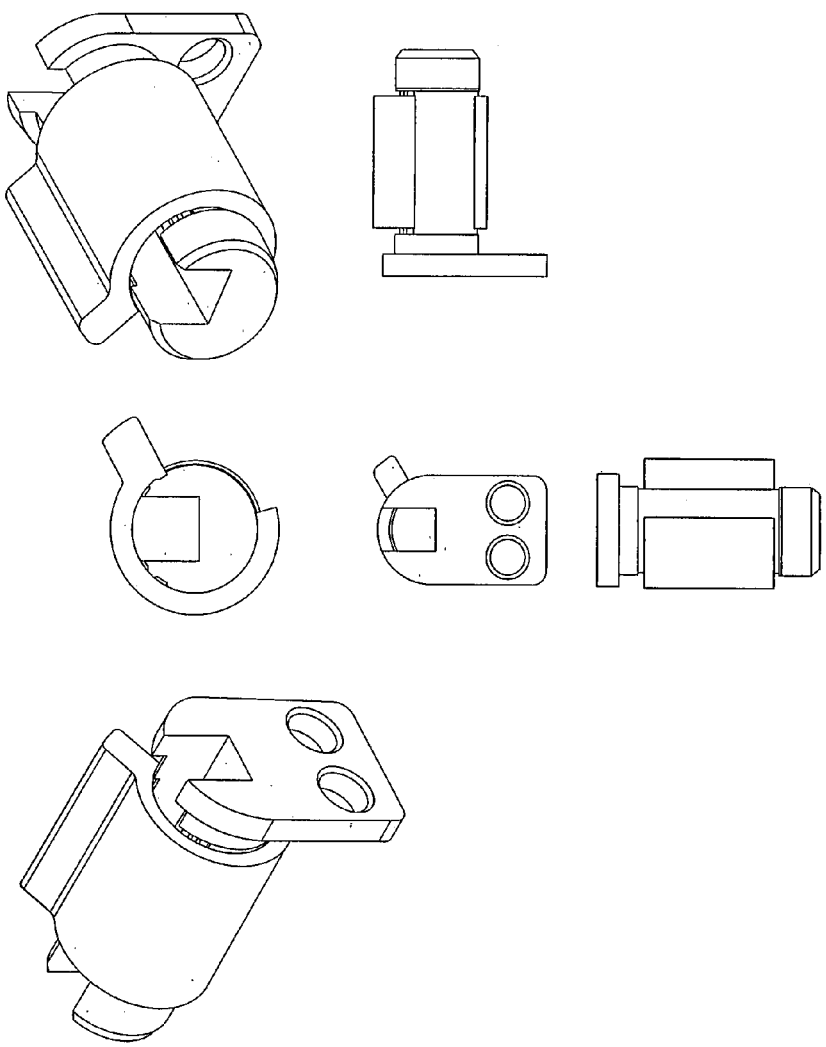
FIG. 11 shows several schematic drawings of the adaptor device and possible measurements and dimensions thereof.

FIG. 11 shows several schematic drawings of the adaptor device, with possible measurements and dimensions given for the components of the adaptor device. Please note that the measurements and dimensions in FIG. 11 are only possible measurements and dimensions, and may vary in other possible embodiments.

Figure 12:
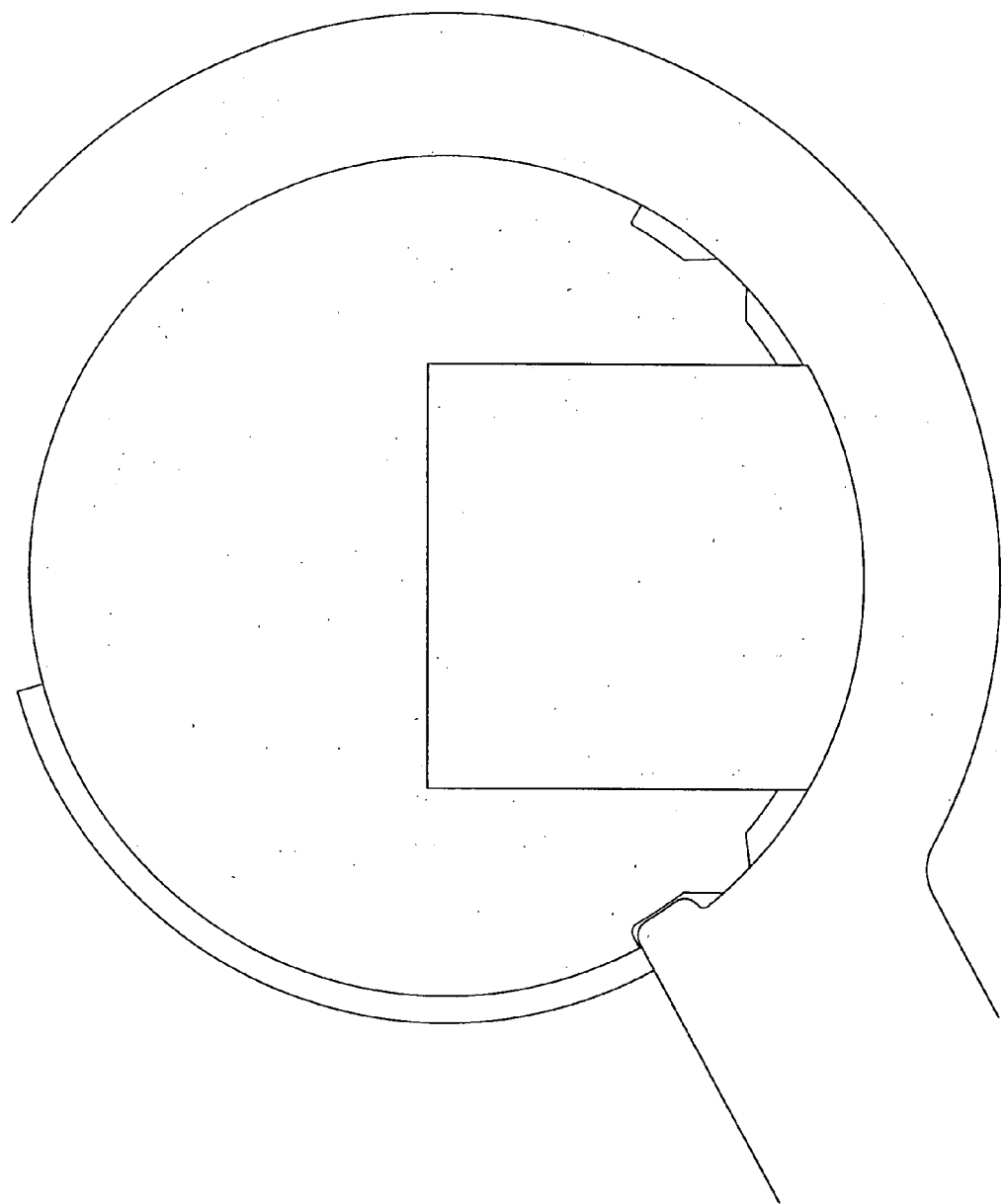
FIG. 12 is a cross-sectional schematic drawing of the adaptor device in a locked position.
Figure 12A:
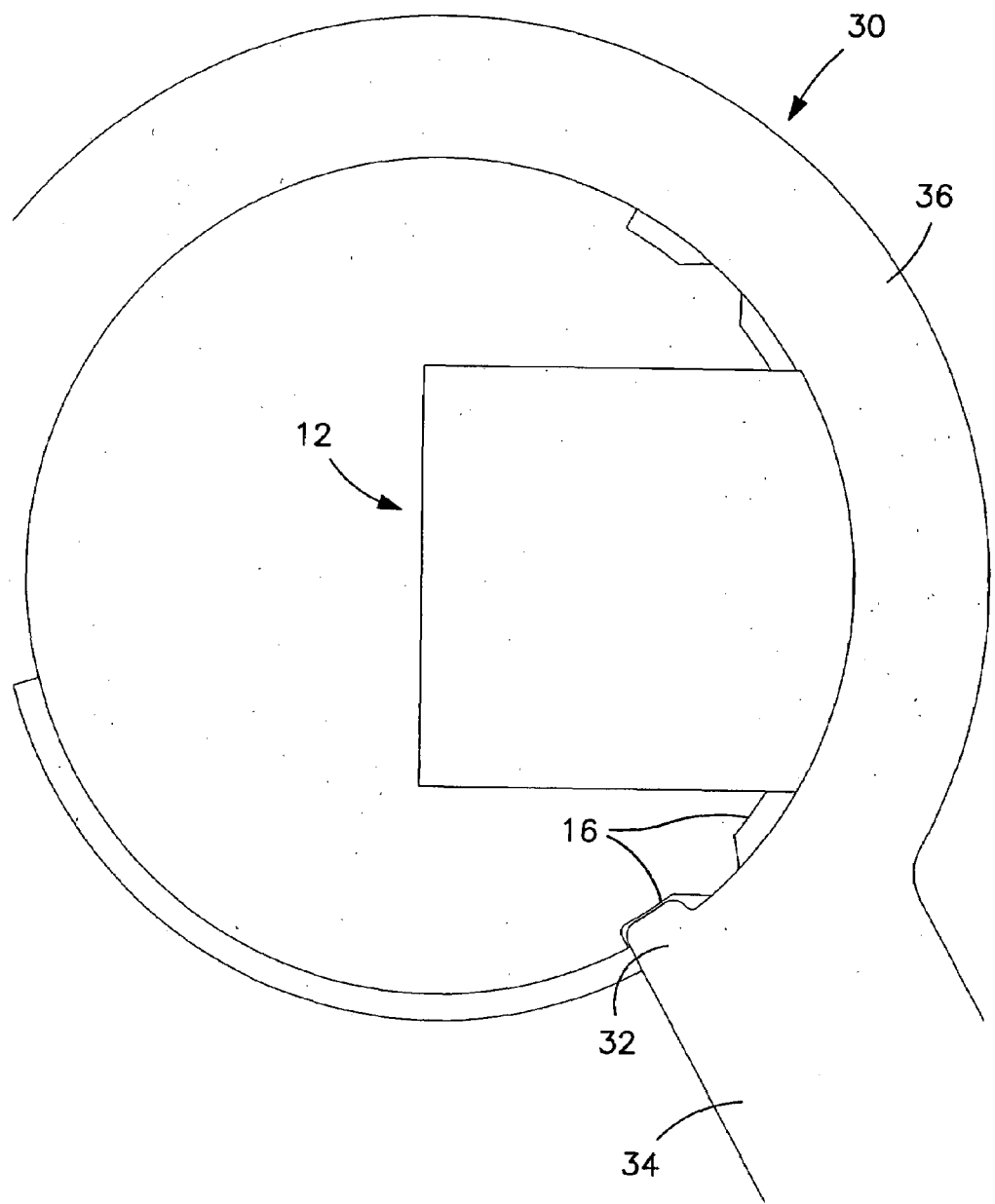
FIG. 12A is similar to FIG. 12 and shows a cross-sectional schematic drawing of the adaptor device in a locked position.

FIGS. 12 and 12A show a cross-sectional view of the adaptor device with the locking device 30 installed thereon, in a locked position. From this view, the locking grooves 16 can be seen as indentations on the substantially cylindrical body portion 10, running parallel to the open side 14. The locking lip 32 can be seen in the locked position, engaged with and resting inside the locking groove 16.

Figure 13:
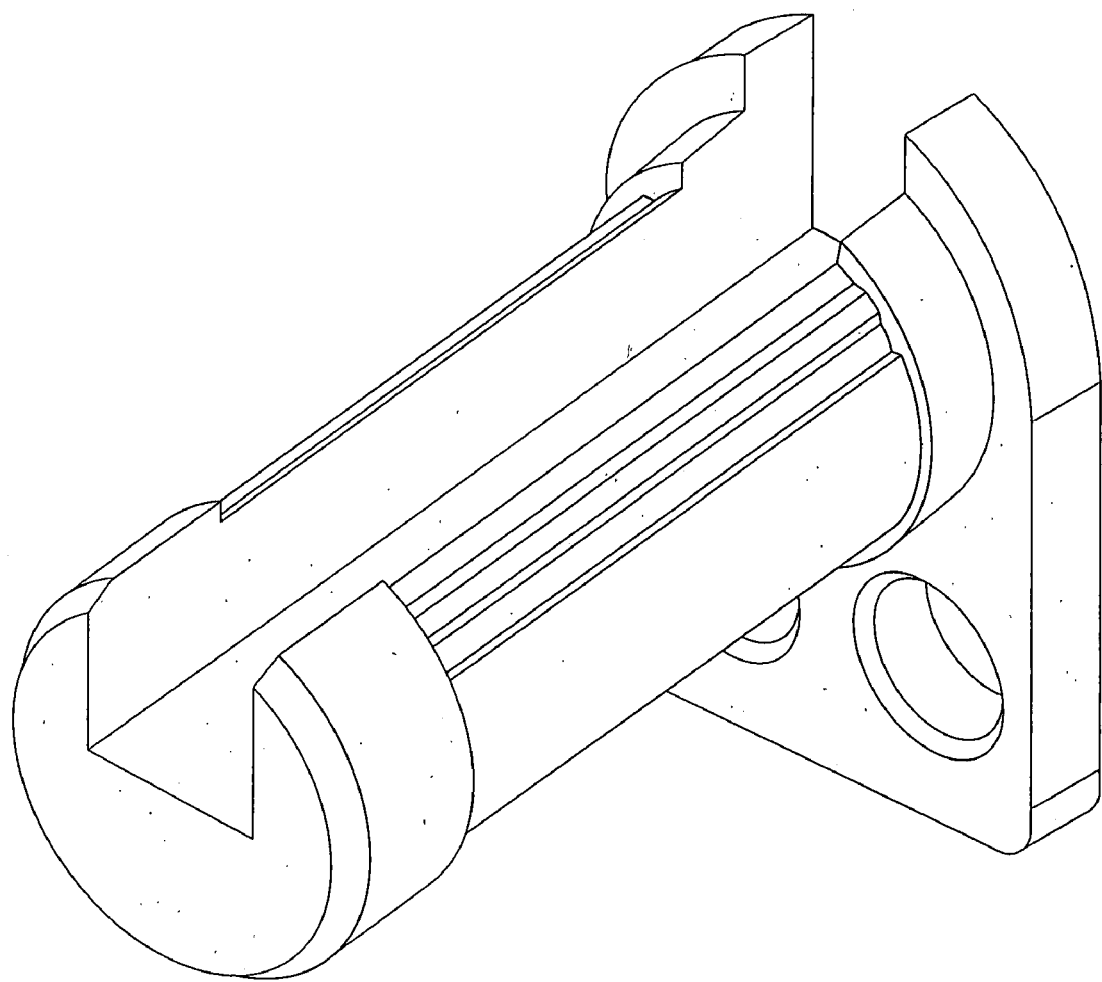
FIG. 13 shows a perspective view of the adaptor device without the locking mechanism installed thereon.
Figure 14:
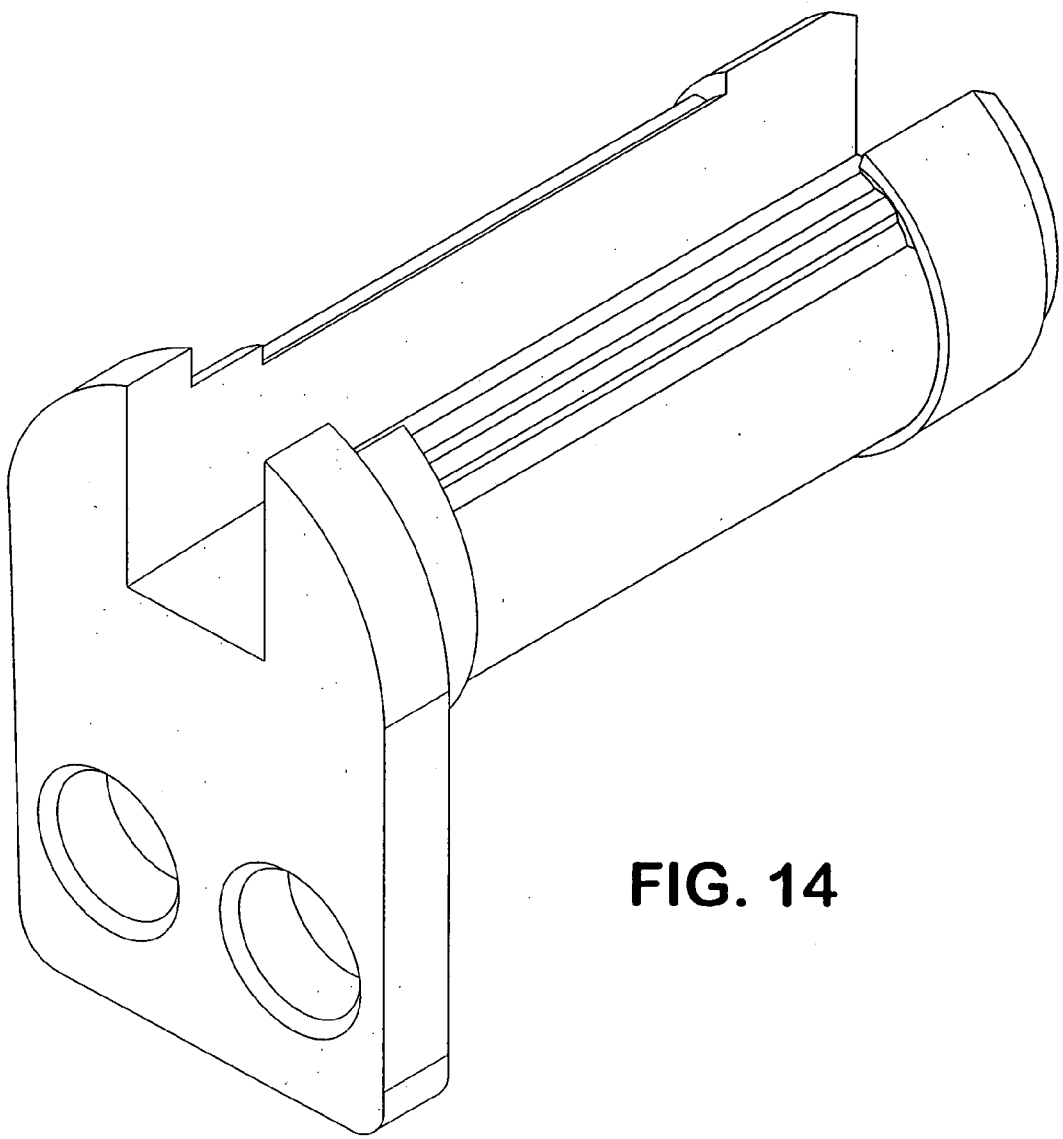
FIG. 14 shows a perspective view of the adaptor device without the locking mechanism installed thereon.
Figure 16:
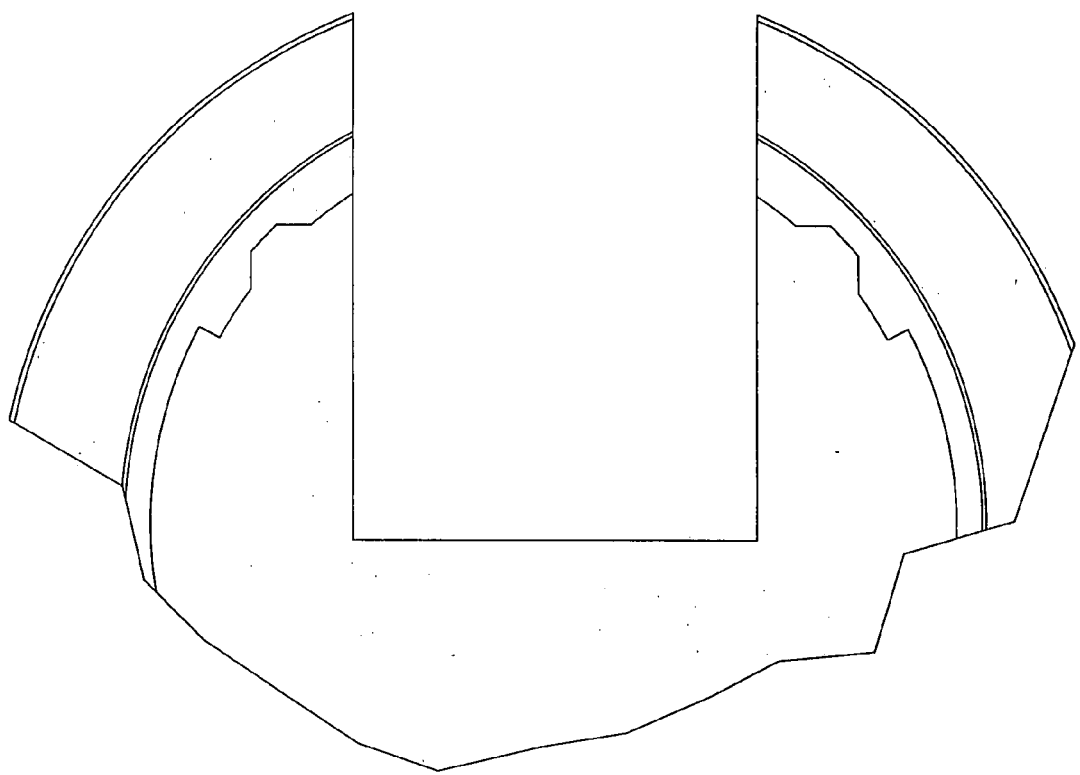
FIG. 16 shows an exploded view of the locking grooves on the adaptor device and possible measurements and dimensions thereof.

FIG. 13 is similar to FIG. 1B, and shows a perspective view of the adaptor device without the locking device 30 installed thereon. A clear view of the locking grooves 16, as well as the rectangular open portion 12, can be seen clearly in FIG. 13. FIG. 14 is a perspective view of the adaptor device without the locking device 30 installed thereon. The first end portion 18, the rear extension 20, and the holes 22 can be seen clearly in FIG. 14. FIG. 16 is also a cross-sectional view of the adaptor device, without the locking device 30 installed thereon. Possible measurements and dimensions for the adaptor device are indicated in FIG. 16. Please note that the measurements and dimensions in FIG. 16 are only possible measurements and dimensions, and may vary in other possible embodiments.

Figure 15:
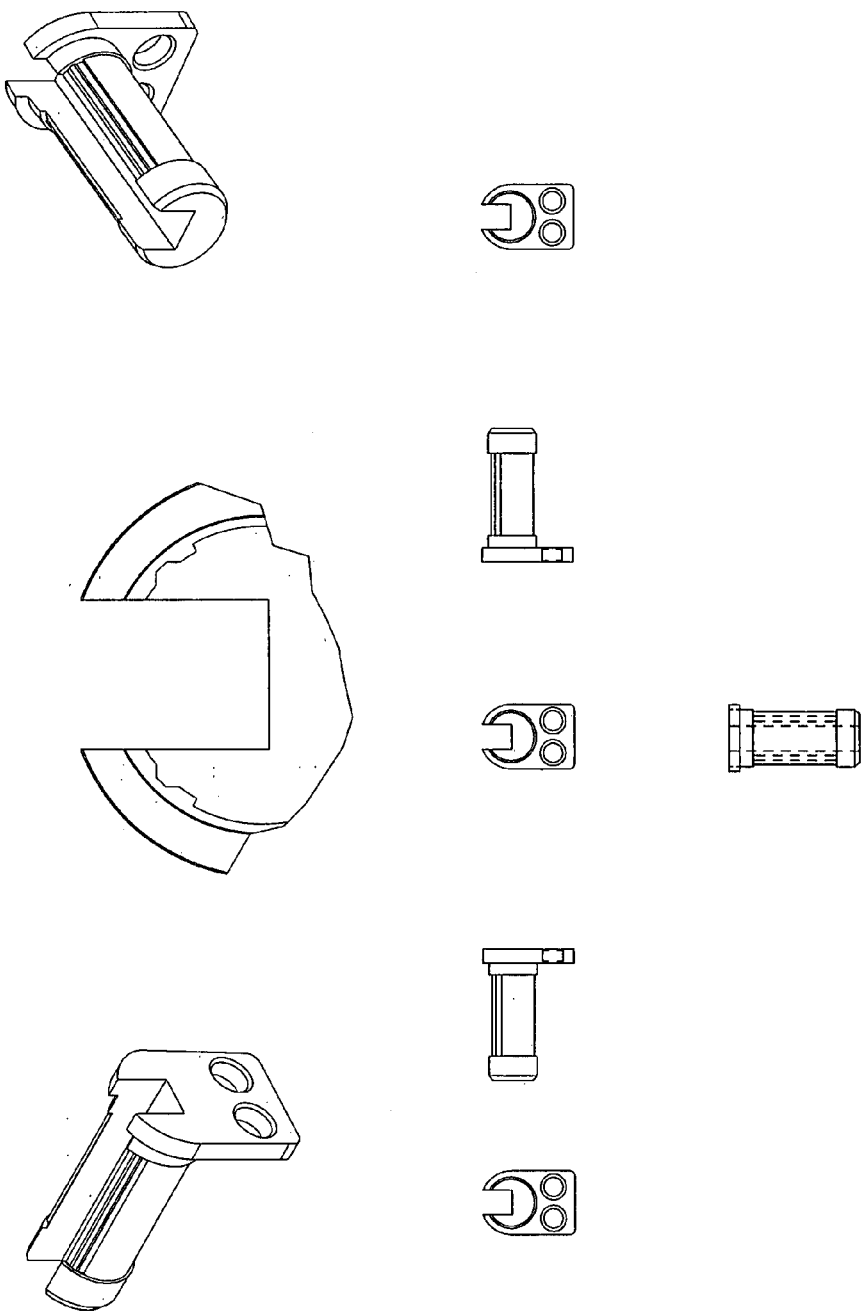
FIG. 15 shows several schematic drawings of the adaptor device and possible measurements and dimensions thereof.

FIG. 15 shows several schematic drawings of the adaptor device with possible measurements and dimensions indicated. Please note that the measurements and dimensions indicated in FIG. 15 are only possible measurements and dimensions, and may vary in other possible embodiments.

Figure 17:
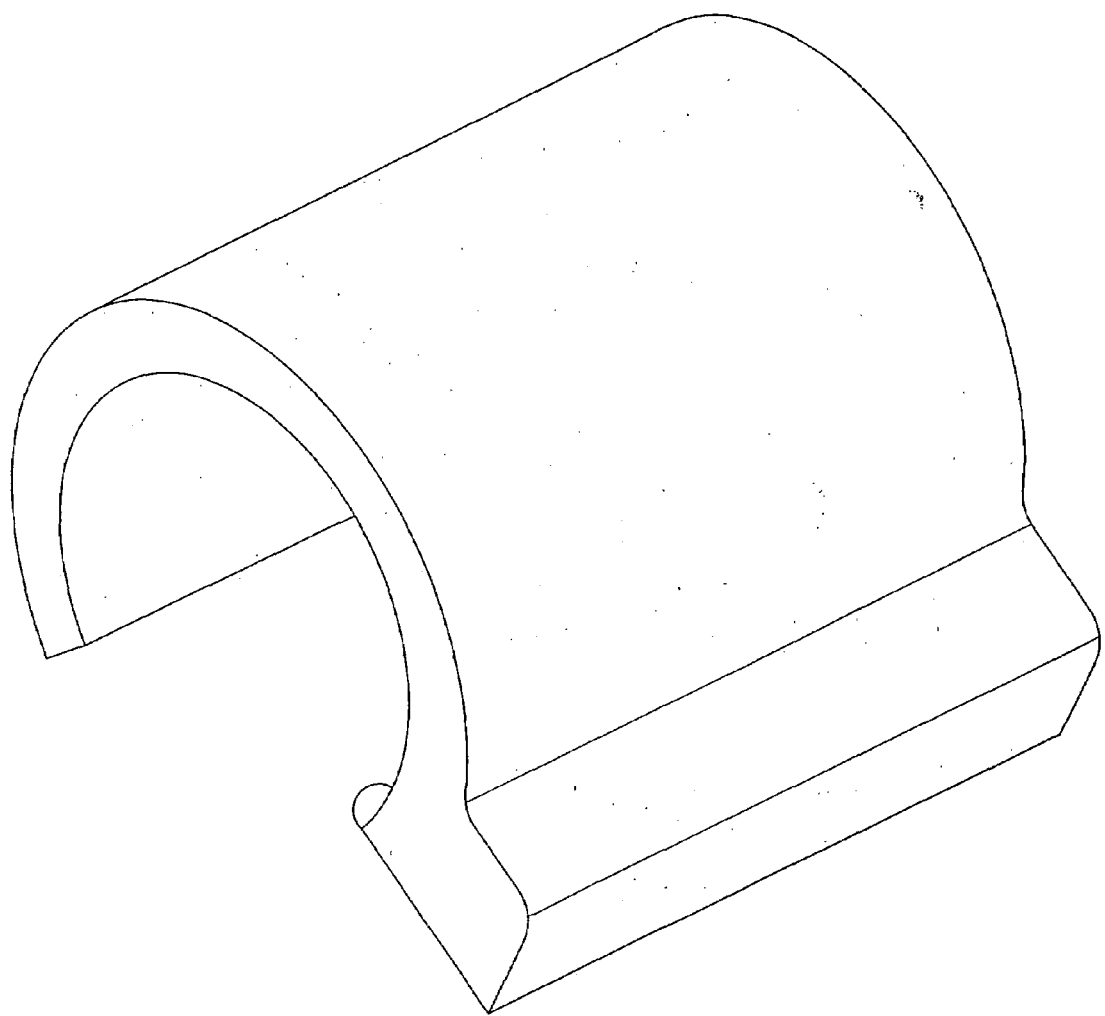
FIG. 17 shows a perspective view of the locking device, which locking device is not installed on the adaptor device.
Figure 18:
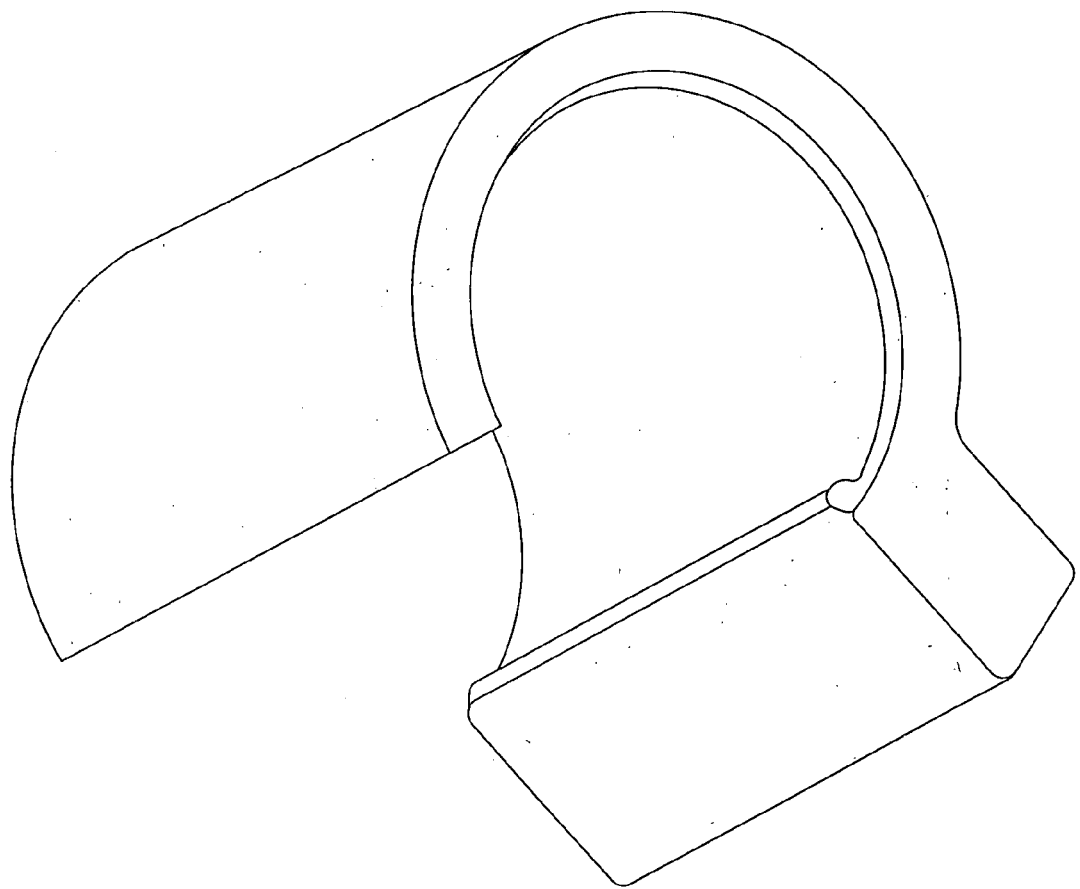
FIG. 18 shows a perspective view of the locking device, which locking device is not installed on the adaptor device.

FIGS. 17 and 18 show a perspective view of the locking device 30, not installed on the substantially cylindrical body portion 10 of the adaptor device. FIG. 17 shows a perspective view of the outside of the curved piece 36. FIG. 18 shows a perspective view of the inside of the curved piece 36.

Figure 19:
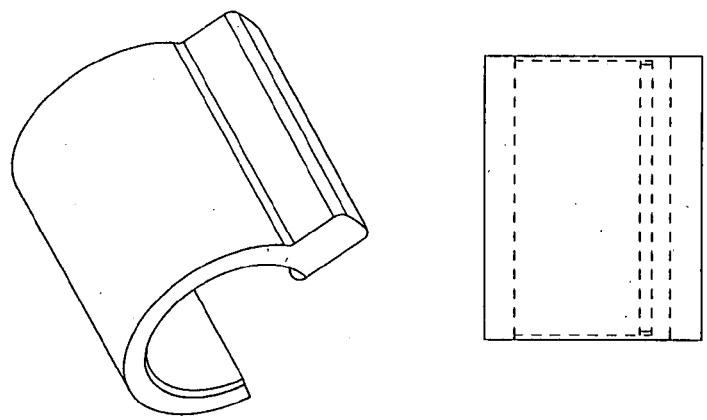
FIG. 19 shows several schematic drawings of the locking device and possible measurements and dimensions thereof.
Figure 19:
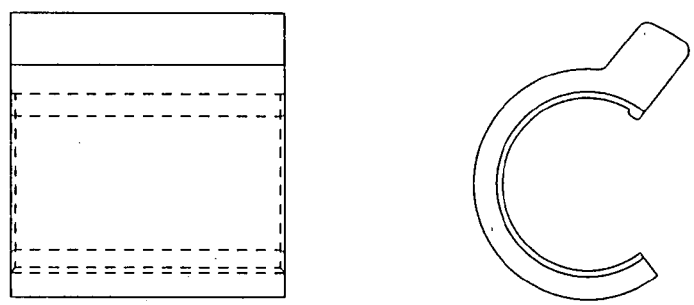
Figure 19:
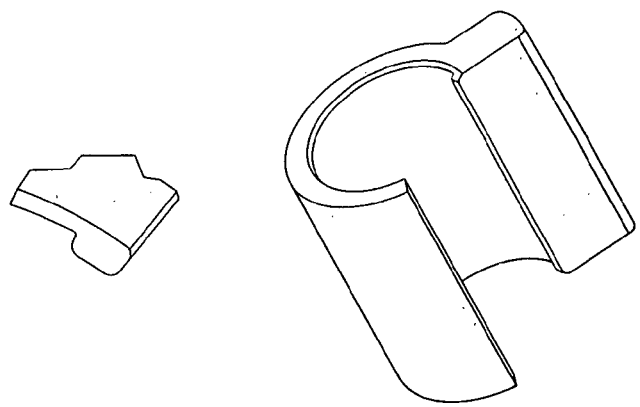

FIG. 19 shows several schematic drawings of the locking device 30. Possible measurements and dimensions are indicated for the locking device 30. Please note that the measurements and dimensions indicated in FIG. 19 are only possible measurements and dimensions, and may vary in other possible embodiments.

Another possible embodiment of the adaptor device could be used to carry other objects on a strap or harness around the body of a user, without the use of a user's hands. For example, the adaptor device could be used to carry devices such as fishing rods; golf clubs, including drivers, putters, and sand wedges, among others; tools such as hammers, wrenches, level devices, screwdrivers, drills, pliers, ratchets, clamps, vices, files, rakes, shovels, hoes, brooms, and plungers, among others; and sporting equipment, such as lacrosse sticks, hockey sticks, field hockey sticks, baseball bats, cricket bats, tennis rackets, badminton rackets, and croquet mallets, among others.

U.S. Provisional Application Ser. No. 60/646,067, filed on Jan. 21, 2005, having inventor Gregg Ewing and is hereby incorporated by reference as if set forth in its entirety herein.

One feature or aspect of an embodiment is believed at the time of the filing of this patent application to possibly reside broadly in a compound archery bow, comprising a handle portion, limbs joined to said handle portion and having outer ends formed thereon, cables interconnected to the outer ends of said limbs and extending therebetween a string secured between the outer ends of said limbs, a cable guard secured to said handle portion and extending rearwardly therefrom, a harness configured to be worn by a user, and an adaptor device mounted on said cable guard for use in carrying said compound archery bow on said harness around the body of a user, said adaptor device comprising: a substantially cylindrical body portion 10, said substantially cylindrical body portion 10 comprising: a first end and a second end; a middle portion; said first end of said substantially cylindrical body portion 10 comprising a first end portion 18; said second end of said substantially cylindrical body portion 10 comprising a second end portion 28; said first end portion 18 comprising a rear extension piece 20; said rear extension piece 20 comprising two holes 22 being configured and disposed to receive and securely hold a carrier ring 24 to connect said adaptor device, and thus said compound archery bow, to said harness worn by a user; a rectangular open portion 12 being disposed through said first end portion 18, said middle portion, and said second end portion 28; an open side 14, said open side 14 exposing said open portion 12; said middle portion of said substantially cylindrical body portion 10 having a set of locking grooves 16 disposed on each side of said open side 14 and disposed parallel to said open side 14, said locking grooves 16 running from said first end portion 18 to said second end portion 28; a moveable locking device 30, said moveable locking device 30 comprising: a substantially C-shaped piece 36; an extended tab 34 disposed at one end of said substantially C-shaped piece 36 and extending horizontally from said substantially C-shaped piece 36; a locking lip 32 disposed at the convergence of the inner edge of said substantially C-shaped piece 36 and said extended tab 34; said moveable locking device 30 being configured and disposed to move from an open, non-locked position to a closed, locked position upon said adaptor device being installed on a compound bow and being configured and disposed to cover and at least substantially close said open side 14 of said cylindrical body portion 10 in use; and said locking lip 32 being configured and disposed to engage with said locking grooves 16 upon said moveable locking device 30 being moved into a closed, locked position.

Another feature or aspect of an embodiment is believed at the time of the filing of this patent application to possibly reside broadly in a compound archery bow, wherein said adaptor device, configured to be disposed on the cable guard of said compound archery bow, is disposed substantially between the handle portion and the cables of the bow.

Yet another feature or aspect of an embodiment is believed at the time of the filing of this patent application to possibly reside broadly in a compound archery bow, wherein said adaptor device is configured to be removable, and configured to be used by both left handed and right handed users.

Still another feature or aspect of an embodiment is believed at the time of the filing of this patent application to possibly reside broadly in a compound archery bow, wherein said adaptor device comprises plastic nylon.

A further feature or aspect of an embodiment is believed at the time of the filing of this patent application to possibly reside broadly in a compound archery bow, wherein said rectangular open portion 12 is non-curvilinear, elliptical, circular, or non-circular.

Another feature or aspect of an embodiment is believed at the time of the filing of this patent application to possibly reside broadly in a compound archery bow, wherein said first end portion 18 and said second end portion 28 are configured and disposed to hold said locking device in place on said substantially cylindrical body portion 10.

Yet another feature or aspect of an embodiment is believed at the time of the filing of this patent application to possibly reside broadly in an adaptor device being configured to be mounted on a cable guard of a compound archery bow for use in carrying said compound archery bow on a harness of a user, said adaptor device comprising: a substantially cylindrical body portion 10, said substantially cylindrical body portion 10 comprising: a top end, a middle portion, and a bottom end; said top end comprising a rear extension piece 20; said rear extension piece 20 comprising at least one hole 22 being configured and disposed to receive and securely hold a carrier ring 24; an open portion 12 being disposed through said substantially cylindrical body portion 10; an open side 14, said open side 14 exposing said open portion 12; a set of locking grooves 16 disposed on each side of said open side 14 of said open portion 12 and disposed parallel to said open portion 12, said locking grooves 16 running from said top end to said bottom end; a locking device 30, said locking device 30 comprising: a substantially C-shaped piece 36; a tab 34 being disposed at one end of said substantially C-shaped piece 36 and extending horizontally from said substantially C-shaped piece 36; a locking lip 32 being disposed at the convergence of the inner edge of said substantially C-shaped piece 36 and said tab 34; said tab 34 being configured to be pushed to move said locking device 30 from an open, non-locked position to a closed, locked position upon said adaptor device being installed on a compound archery bow and being configured and disposed to cover and substantially close said open side 14 of said cylindrical body portion 10 in use; and said locking lip 32 being configured and disposed to engage with said locking grooves 16 upon said locking device being moved into a closed, locked position.

A further feature or aspect of an embodiment is believed at the time of the filing of this patent application to possibly reside broadly in an adaptor device, wherein: said top end of substantially cylindrical body portion 10 comprises a first end portion 18; and said bottom end of said substantially cylindrical body portion 10 comprises a second end portion 28.

Another feature or aspect of an embodiment is believed at the time of the filing of this patent application to possibly reside broadly in an adaptor device, wherein said first end portion 18 and said second end portion 28 are configured and disposed to hold said locking device 30 in place on said substantially cylindrical body portion 10.

Yet another feature or aspect of an embodiment is believed at the time of the filing of this patent application to possibly reside broadly in an adaptor device, wherein: said compound archery bow comprises a handle portion, a cable guard, and cables; and said adaptor device, configured to be disposed on said cable guard of said compound archery bow, is disposed substantially between said handle portion and said cables of said compound archery bow.

Still another feature or aspect of an embodiment is believed at the time of the filing of this patent application to possibly reside broadly in an adaptor device, wherein said adaptor device is configured to be removable, and configured to be used by both left handed and right handed users.

Yet another feature or aspect of an embodiment is believed at the time of the filing of this patent application to possibly reside broadly in an adaptor device, wherein said adaptor device comprises plastic nylon.

A further feature or aspect of an embodiment is believed at the time of the filing of this patent application to possibly reside broadly in an adaptor device, wherein said open portion 12 is rectangular, non-curvilinear, elliptical, circular, or non-circular.

Another feature or aspect of an embodiment is believed at the time of the filing of this patent application to possibly reside broadly in an adaptor device being configured to be mounted on a cable guard of a compound archery bow for use in carrying said compound archery bow on a harness worn by a user, said adaptor device comprising: an elongated body portion 10, said elongated body portion 10 comprising: a top end, a middle portion, and a bottom end; said top end comprising a rear extension piece 20; said rear extension piece 20 comprising at least one hole 22 being configured and disposed to receive and securely hold a carrier ring 24; an elongated open portion 12 being disposed through said elongated body portion 10 and being configured to receive an elongated portion of a compound archery bow; an open side 14, said open side 14 exposing said elongated open portion 12; at least one locking groove 16 being disposed on at least one side of said open side of said elongated open portion 12 and being disposed parallel to said elongated open portion 12, said at least one locking groove 16 running from said top end to said bottom end; a locking device 30 being configured and disposed to attach said adaptor device onto a compound archery bow; said locking device 30 comprising a tab 34; said locking device 30 comprising a locking lip 32; said tab 34 being configured to be pushed to move said locking device 30 from an open, non-locked position to a closed, locked position upon said adaptor device being installed on a compound archery bow and being configured and disposed to cover and substantially close said elongated open side 14 of said elongated body portion 10 in use; and said locking lip 32 being configured and disposed to engage with said at least one locking groove 16 upon said locking device 30 being moved into a closed, locked position.

Yet another feature or aspect of an embodiment is believed at the time of the filing of this patent application to possibly reside broadly in an adaptor device, wherein: said top end of said elongated body portion 10 comprises a first end portion 18; and said bottom end of said elongated body portion 10 comprises a second end portion 28.

Still another feature or aspect of an embodiment is believed at the time of the filing of this patent application to possibly reside broadly in an adaptor device, wherein said first end portion 18 and said second end portion 28 are configured and disposed to hold said locking device 30 in place on said elongated body portion 10.

A further feature or aspect of an embodiment is believed at the time of the filing of this patent application to possibly reside broadly in an adaptor device, wherein: said compound archery bow comprises a handle portion, a cable guard, and cables; and said adaptor device, configured to be disposed on said cable guard of said compound archery bow, is disposed substantially between said handle portion and said cables of said compound archery bow.

A further feature or aspect of an embodiment is believed at the time of the filing of this patent application to possibly reside broadly in an adaptor device, wherein said adaptor device is configured to be removable, and configured to be used by both left handed and right handed users.

Another feature or aspect of an embodiment is believed at the time of the filing of this patent application to possibly reside broadly in an adaptor device, wherein said adaptor device comprises plastic nylon.

Yet another feature or aspect of an embodiment is believed at the time of the filing of this patent application to possibly reside broadly in an adaptor device, wherein said elongated open portion 12 is rectangular, non-curvilinear, elliptical, circular, or non-circular.

Yet another feature or aspect of an embodiment is believed at the time of the filing of this patent application to possibly reside broadly in a compound archery bow with an adaptor device being configured to be mounted on a cable guard of a compound archery bow for use in carrying said compound archery bow on a harness of a user, said adaptor device comprising: a substantially cylindrical body portion, said substantially cylindrical body portion comprising: a top end, a middle portion, and a bottom end; said top end comprising a rear extension piece; said rear extension piece comprising at least one hole being configured and disposed to receive and securely hold a carrier ring; an open portion being disposed through said substantially cylindrical body portion; an open side, said open side exposing said open portion; a set of locking grooves disposed on each side of said open side of said open portion and disposed parallel to said open portion, said locking grooves running from said top end to said bottom end; a locking device, said locking device comprising: a substantially C-shaped piece; a tab being disposed at one end of said substantially C-shaped piece and extending horizontally from said substantially C-shaped piece; a locking lip being disposed at the convergence of the inner edge of said substantially C-shaped piece and said tab; said tab being configured to be pushed to move said locking device from an open, non-locked position to a closed, locked position upon said adaptor device being installed on a compound archery bow and being configured and disposed to cover and substantially close said open side of said cylindrical body portion in use; and said locking lip being configured and disposed to engage with said locking grooves upon said locking device being moved into a closed, locked position.

Still another feature or aspect of an embodiment is believed at the time of the filing of this patent application to possibly reside broadly in a compound archery bow and an adaptor device according to Claim 7, wherein: said top end of substantially cylindrical body portion comprises a first end portion; and said bottom end of said substantially cylindrical body portion comprises a second end portion.

A further feature or aspect of an embodiment is believed at the time of the filing of this patent application to possibly reside broadly in a compound archery bow and an adaptor device, wherein said first end portion and said second end portion are configured and disposed to hold said locking device in place on said substantially cylindrical body portion.

Another feature or aspect of an embodiment is believed at the time of the filing of this patent application to possibly reside broadly in a compound archery bow and an adaptor device, wherein: said compound archery bow comprises a handle portion, a cable guard, and cables; and said adaptor device, configured to be disposed on said cable guard of said compound archery bow, is disposed substantially between said handle portion and said cables of said compound archery bow.

Yet another feature or aspect of an embodiment is believed at the time of the filing of this patent application to possibly reside broadly in a compound archery bow and an adaptor device, wherein said adaptor device is configured to be removable, and configured to be used by both left handed and right handed users.

Still another feature or aspect of an embodiment is believed at the time of the filing of this patent application to possibly reside broadly in a compound archery bow and an adaptor device, wherein said adaptor device comprises plastic nylon.

A further feature or aspect of an embodiment is believed at the time of the filing of this patent application to possibly reside broadly in a compound archery bow and an adaptor device, wherein said open portion is rectangular, non-curvilinear, elliptical, circular, or non-circular.

Another feature or aspect of an embodiment is believed at the time of the filing of this patent application to possibly reside broadly in a compound archery bow with an adaptor device being configured to be mounted on a cable guard of a compound archery bow for use in carrying said compound archery bow on a harness worn by a user, said adaptor device comprising: an elongated body portion, said elongated body portion comprising: a top end, a middle portion, and a bottom end; said top end comprising a rear extension piece; said rear extension piece comprising at least one hole being configured and disposed to receive and securely hold a carrier ring; an elongated open portion being disposed through said elongated body portion and being configured to receive an elongated portion of a compound archery bow; an open side, said open side exposing said elongated open portion; at least one locking groove being disposed on at least one side of said open side of said elongated open portion and being disposed parallel to said elongated open portion, said at least one locking groove running from said top end to said bottom end; a locking device being configured and disposed to attach said adaptor device onto a compound archery bow; said locking device comprising a tab; said locking device comprising a locking lip; said tab being configured to be pushed to move said locking device from an open, non-locked position to a closed, locked position upon said adaptor device being installed on a compound archery bow and being configured and disposed to cover and substantially close said elongated open side of said elongated body portion in use; and said locking lip being configured and disposed to engage with said at least one locking groove upon said locking device being moved into a closed, locked position.

Yet another feature or aspect of an embodiment is believed at the time of the filing of this patent application to possibly reside broadly in a compound archery bow and an adaptor device, wherein: said top end of said elongated body portion comprises a first end portion; and said bottom end of said substantially cylindrical body portion comprises a second end portion.

Still another feature or aspect of an embodiment is believed at the time of the filing of this patent application to possibly reside broadly in a compound archery bow and an adaptor device, wherein said first end portion and said second end portion are configured and disposed to hold said locking device in place on said elongated body portion.

A further feature or aspect of an embodiment is believed at the time of the filing of this patent application to possibly reside broadly in a compound archery bow and an adaptor device, wherein: said compound archery bow comprises a handle portion, a cable guard, and cables; and said adaptor device, configured to be disposed on said cable guard of said compound archery bow, is disposed substantially between said handle portion and said cables of said compound archery bow.

Another feature or aspect of an embodiment is believed at the time of the filing of this patent application to possibly reside broadly in a compound archery bow and an adaptor device, wherein said adaptor device is configured to be removable, and configured to be used by both left handed and right handed users.

Yet another feature or aspect of an embodiment is believed at the time of the filing of this patent application to possibly reside broadly in a compound archery bow and an adaptor device, wherein said adaptor device comprises plastic nylon.

Still another feature or aspect of an embodiment is believed at the time of the filing of this patent application to possibly reside broadly in a compound archery bow and an adaptor device, wherein said elongated open portion is rectangular, non-curvilinear, elliptical, circular, or non-circular.

Yet another feature or aspect of an embodiment is believed at the time of the filing of this patent application to possibly reside broadly in a compound archery bow, comprising a handle portion, limbs joined to said handle portion and having outer ends formed thereon, cables interconnected to the outer ends of said limbs and extending therebetween a string secured between the outer ends of said limbs, a cable guard secured to said handle portion and extending rearwardly therefrom, a harness configured to be worn by a user, and an adaptor device mounted on said cable guard for use in carrying said compound archery bow on said harness around the body of a user, said adaptor device comprising: a substantially cylindrical body portion, said substantially cylindrical body portion comprising: a first end and a second end; a middle portion; said first end of said substantially cylindrical body portion comprising a substantially C-shaped first end portion; said second end of said substantially cylindrical body portion comprising a substantially C-shaped second end portion; said substantially C-shaped first end portion comprising a rear extension piece; said rear extension piece comprising two holes being configured and disposed to receive and securely hold a carrier ring to connect said adaptor device, and thus said compound archery bow, to said harness worn by a user; a rectangular open portion being disposed through said first end portion, said middle portion, and said substantially C-shaped second end portion; an open side, said open side exposing said open portion; said middle portion of said substantially cylindrical body portion having a set of locking grooves disposed on each side of said open side and disposed parallel to said open side, said locking grooves running from said substantially C-shaped first end portion to said substantially C-shaped second end portion; a moveable locking device, said moveable locking device comprising: a substantially C-shaped piece; an extended tab disposed at one end of said substantially C-shaped piece and extending horizontally from said substantially C-shaped piece; a locking lip disposed at the convergence of the inner edge of said substantially C-shaped piece and said extended tab; said moveable locking device being configured and disposed to move from an open, non-locked position to a closed, locked position upon said adaptor device being installed on a compound bow and being configured and disposed to cover and at least substantially close said open side of said cylindrical body portion in use; and said locking lip being configured and disposed to engage with said locking grooves upon said moveable locking device being moved into a closed, locked position.

Still another feature or aspect of an embodiment is believed at the time of the filing of this patent application to possibly reside broadly in a compound archery bow, wherein said substantially C-shaped first end portion and said substantially C-shaped second end portion are configured and disposed to hold said locking device in place on said substantially cylindrical body portion.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of compound archery bows which may possibly be utilized or adapted for use in at least one possible embodiment may possibly be found in the following U.S. Pat. No. 6,763,818, entitled "Compound archery bow;" U.S. Pat. No. 6,666,202, entitled "Single-cam compound archery bow;" U.S. Pat. No. 6,659,096, entitled "Split-buss-cable single-cam compound archery bow;" U.S. Pat. No. 6,516,790, entitled "Single-cam compound archery bow;" U.S. Pat. No. 6,112,732, entitled "Compound archery bow;" U.S. Pat. No. 6,082,347, entitled "Single-cam compound archery bow;" U.S. Pat. No. 5,960,778, entitled "Compound archery bow;" U.S. Pat. No. 5,947,099, entitled "Extended fork compound archery bow;" U.S. Pat. No. 5,934,265, entitled "Single-cam compound archery bow;" U.S. Pat. No. 5,921,227, entitled "Compound archery bow;" and U.S. Pat. No. 5,901,692, entitled "Compound archery bow," and U.S. Provisional Application Ser. No. 60/685,099, filed on May 26, 2005, having inventor Gregg Ewing are hereby incorporated by reference as if set forth in its entirety herein.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

Some examples of adaptor devices which may possibly be utilized or adapted for use in at least one possible embodiment may possibly be found in the following U.S. patents: U.S. Pat. No. 5,239,976, entitled "Compound archery bow having a carrying adaptor mounted thereon;" U.S. Pat. No. 5,816,461, entitled "Carrying adaptor for a compound bow;" U.S. Pat. No. 5,730,341, entitled "Sling assembly for a compound bow;" and U.S. Pat. No. 6,591,825, entitled "Sling assembly for carrying and stabilizing a crossbow."

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A compound archery bow, comprising a handle portion, limbs joined to said handle portion and having outer ends formed thereon, cables interconnected to the outer ends of said limbs and extending therebetween a string secured between the outer ends of said limbs, a cable guard secured to said handle portion and extending rearwardly therefrom, a harness configured to be worn by a user, and an adaptor device mounted on said cable guard for use in carrying said compound archery bow on said harness around the body of a user, said adaptor device comprising:

a substantially cylindrical body portion, said substantially cylindrical body portion comprising:

a first end and a second end;

a middle portion;

said first end of said substantially cylindrical body portion comprising a first end portion;

said second end of said substantially cylindrical body portion comprising a second end portion;

said first end portion comprising a rear extension piece;

said rear extension piece comprising two holes being configured and disposed to receive and securely hold a carrier ring to connect said adaptor device, and thus said compound archery bow, to said harness worn by a user;

a rectangular open portion being disposed through said first end portion, said middle portion, and said second end portion;

an open side, said open side exposing said open portion;

said middle portion of said substantially cylindrical body portion having a set of locking grooves disposed on each side of said open side and disposed parallel to said open side, said locking grooves running from said first end portion to said second end portion;

a moveable locking device, said moveable locking device comprising:
  a substantially C-shaped piece;
  an extended tab disposed at one end of said substantially C-shaped piece and extending horizontally from said substantially C-shaped piece;
  a locking lip disposed at the convergence of the inner edge of said substantially C-shaped piece and said extended tab;

said moveable locking device being configured and disposed to move from an open, non-locked position to a closed, locked position upon said adaptor device being installed on a compound bow and being configured and disposed to cover and at least substantially close said open side of said cylindrical body portion in use; and said locking lip being configured and disposed to engage with said locking grooves upon said moveable locking device being moved into a closed, locked position.

2. The compound archery bow according to claim 1, wherein said adaptor device, configured to be disposed on the cable guard of said compound archery bow, is disposed substantially between the handle portion and the cables of the bow.

3. The compound archery bow according to claim 2, wherein said adaptor device is configured to be removable, and configured to be used by both left handed and right handed users.

4. The compound archery bow according to claim 3, wherein said adaptor device comprises plastic nylon.

5. The compound archery bow according to claim 4, wherein said rectangular open portion is non-curvilinear, elliptical, circular, or non-circular.

6. The compound archery bow according to claim 5, wherein said first end portion and said second end portion are configured and disposed to hold said locking device in place on said substantially cylindrical body portion.

7. A compound archery bow with an adaptor device being configured to be mounted on a cable guard of a compound archery bow for use in carrying said compound archery bow on a harness of a user, said adaptor device comprising:

a substantially cylindrical body portion, said substantially cylindrical body portion comprising:
  a top end, a middle portion, and a bottom end;
  said top end comprising a rear extension piece;
  said rear extension piece comprising at least one hole being configured and disposed to receive and securely hold a carrier ring;
  an open portion being disposed through said substantially cylindrical body portion;
  an open side, said open side exposing said open portion;
  a set of locking grooves disposed on each side of said open side of said open portion and disposed parallel to said open portion, said locking grooves running from said top end to said bottom end;

a locking device, said locking device comprising:
  a substantially C-shaped piece;
  a tab being disposed at one end of said substantially C-shaped piece and extending horizontally from said substantially C-shaped piece;
  a locking lip being disposed at the convergence of the inner edge of said substantially C-shaped piece and said tab;

said tab being configured to be pushed to move said locking device from an open, non-locked position to a closed, locked position upon said adaptor device being installed on a compound archery bow and being configured and disposed to cover and substantially close said open side of said cylindrical body portion in use; and said locking lip being configured and disposed to engage with said locking grooves upon said locking device being moved into a closed, locked position.

8. The compound archery bow and the adaptor device according to claim 7, wherein:
said top end of substantially cylindrical body portion comprises a first end portion; and
said bottom end of said substantially cylindrical body portion comprises a second end portion.

9. The compound archery bow and the adaptor device according to claim 8, wherein said first end portion and said second end portion are configured and disposed to hold said locking device in place on said substantially cylindrical body portion.

10. The compound archery bow and the adaptor device according to claim 9, wherein:
said compound archery bow comprises a handle portion, a cable guard, and cables; and
said adaptor device, configured to be disposed on said cable guard of said compound archery bow, is disposed substantially between said handle portion and said cables of said compound archery bow.

11. The compound archery bow and the adaptor device according to claim 10, wherein said adaptor device is configured to be removable, and configured to be used by both left handed and right handed users.

12. The compound archery bow and the adaptor device according to claim 11, wherein said adaptor device comprises plastic nylon.

13. The compound archery bow and the adaptor device according to claim 12, wherein said open portion is rectangular, non-curvilinear, elliptical, circular, or non-circular.

14. A compound archery bow with an adaptor device being configured to be mounted on a cable guard of a compound archery bow for use in carrying said compound archery bow on a harness worn by a user, said adaptor device comprising:

an elongated body portion, said elongated body portion comprising:
  a top end, a middle portion, and a bottom end;
  said top end comprising a rear extension piece;

said rear extension piece comprising at least one hole being configured and disposed to receive and securely hold a carrier ring;

an elongated open portion being disposed through said elongated body portion and being configured to receive an elongated portion of a compound archery bow;

an open side, said open side exposing said elongated open portion;

at least one locking groove being disposed on at least one side of said open side of said elongated open portion and being disposed parallel to said elongated open portion, said at least one locking groove running from said top end to said bottom end;

a locking device being configured and disposed to attach said adaptor device onto a compound archery bow;

said locking device comprising a tab;

said locking device comprising a locking lip;

said tab being configured to be pushed to move said locking device from an open, non-locked position to a closed, locked position upon said adaptor device being installed on a compound archery bow and being configured and disposed to cover and substantially close said elongated open side of said elongated body portion in use; and said locking lip being configured and disposed to engage with said at least one locking groove upon said locking device being moved into a closed, locked position.

15. The compound archery bow and the adaptor device according to claim 14, wherein:

said top end of said elongated body portion comprises a first end portion; and said bottom end of said substantially cylindrical body portion comprises a second end portion.

16. The compound archery bow and the adaptor device according to claim 15, wherein said first end portion and said second end portion are configured and disposed to hold said locking device in place on said elongated body portion.

17. The compound archery bow and the adaptor device according to claim 16, wherein:

said compound archery bow comprises a handle portion, a cable guard, and cables; and said adaptor device, configured to be disposed on said cable guard of said compound archery bow, is disposed substantially between said handle portion and said cables of said compound archery bow.

18. The compound archery bow and the adaptor device according to claim 17, wherein said adaptor device is configured to be removable, and configured to be used by both left handed and right handed users.

19. The compound archery bow and the adaptor device according to claim 18, wherein said adaptor device comprises plastic nylon.

20. The compound archery bow and the adaptor device according to claim 19, wherein said elongated open portion is rectangular, non-curvilinear, elliptical, circular, or non-circular.

* * * * *